(12) United States Patent
Kim

(10) Patent No.: US 12,164,712 B2
(45) Date of Patent: Dec. 10, 2024

(54) ELECTRONIC DEVICE FOR CONTROLLING OPERATION OF ELECTRONIC PEN DEVICE, OPERATION METHOD IN ELECTRONIC DEVICE, AND NON-TRANSITORY STORAGE MEDIUM

(71) Applicant: SAMSUNG ELECTRONICS CO., LTD., Suwon-si (KR)

(72) Inventor: Sangheon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/136,694

(22) Filed: Apr. 19, 2023

(65) Prior Publication Data
US 2023/0259222 A1 Aug. 17, 2023

Related U.S. Application Data

(63) Continuation of application No. PCT/KR2021/014384, filed on Oct. 15, 2021.

(30) Foreign Application Priority Data

Oct. 19, 2020 (KR) .................. 10-2020-0135467

(51) Int. Cl.
G06F 3/038 (2013.01)
G06F 3/0354 (2013.01)

(52) U.S. Cl.
CPC ........ G06F 3/0383 (2013.01); G06F 3/03545 (2013.01)

(58) Field of Classification Search
CPC .... G06F 3/0383; G06F 3/03545; G06F 3/016; G06F 3/017; G06F 3/0346; G06F 3/0484; G06F 2203/0384
See application file for complete search history.

(56) References Cited

U.S. PATENT DOCUMENTS 7,161,578 B1 * 1/2007 Schneider .............. G02B 27/20
 345/169
2011/0006982 A1 * 1/2011 Rhee .................... G06F 3/0383
 345/157

(Continued)

FOREIGN PATENT DOCUMENTS

CN 104484061 A 4/2015
CN 107783669 A 3/2018

(Continued)

OTHER PUBLICATIONS

International Search Report (PCT/ISA/210) issued Jan. 19, 2022 by the International Searching Authority in counterpart International Application No. PCT/KR2021/014384.

(Continued)

*Primary Examiner* — Hong Zhou
(74) *Attorney, Agent, or Firm* — Sughrue Mion, PLLC

(57) ABSTRACT

An electronic device and an operation method for controlling an operation of an electronic pen device may be provided. According to an embodiment, the process for controlling an electronic device may include controlling a communication module to establish a communication connection with the electronic pen device; switching an operation state of the electronic pen device into an air pointer operation state based on a first signal by a button input of the electronic pen device; acquiring location information of a display module when the button input is released and an air pointer operation is maintained; controlling the display module to display an object indicating the air pointer operation, based on feature information of at least one object displayed on the display module and the location information; and executing an operation corresponding to an action event of the electronic pen device.

15 Claims, 26 Drawing Sheets

(56) References Cited

U.S. PATENT DOCUMENTS

| | | | |
|---|---|---|---|
| 2013/0249793 A1* | 9/2013 | Zhu | G06F 3/017 345/157 |
| 2013/0342456 A1* | 12/2013 | Choi | H04N 21/42224 345/158 |
| 2014/0055426 A1 | 2/2014 | Park et al. | |
| 2014/0055427 A1 | 2/2014 | Kim et al. | |
| 2014/0059499 A1* | 2/2014 | Kim | G06F 3/04812 715/862 |
| 2014/0125606 A1 | 5/2014 | Namkung | |
| 2015/0029104 A1* | 1/2015 | Hori | G06F 3/04842 345/163 |
| 2015/0242002 A1 | 8/2015 | Altman et al. | |
| 2016/0196035 A1* | 7/2016 | Lee | G06F 3/0346 715/810 |
| 2017/0083156 A1 | 3/2017 | Lee et al. | |
| 2017/0220140 A1 | 8/2017 | Black et al. | |
| 2017/0322642 A1* | 11/2017 | Zhang | G06F 3/0484 |
| 2018/0364813 A1* | 12/2018 | Sayah | G06F 3/0346 |
| 2019/0042006 A1 | 2/2019 | Hsieh et al. | |
| 2019/0114070 A1 | 4/2019 | Youn | |
| 2020/0081516 A1 | 3/2020 | Zyskind et al. | |
| 2020/0249774 A1 | 8/2020 | Jung et al. | |
| 2021/0072846 A1 | 3/2021 | Jang et al. | |
| 2021/0240285 A1* | 8/2021 | Rizzardini | G06F 3/0346 |
| 2022/0308679 A1* | 9/2022 | Wu | G06F 3/0383 |

FOREIGN PATENT DOCUMENTS

| | | |
|---|---|---|
| JP | 2009-20718 A | 1/2009 |
| JP | 2015-106111 A | 6/2015 |
| JP | 2019-185118 A | 10/2019 |
| KR | 10-2010-0102996 A | 9/2010 |
| KR | 10-2012-0001930 A | 1/2012 |
| KR | 10-2014-0026711 A | 3/2014 |
| KR | 10-2014-0056959 A | 5/2014 |
| KR | 10-2016-0047385 A | 5/2016 |
| KR | 10-2016-0081855 A | 7/2016 |
| KR | 10-2017-0033656 A | 3/2017 |
| KR | 10-2019-0041826 A | 4/2019 |
| KR | 10-2019-0069877 A | 6/2019 |
| KR | 10-2084041 B1 | 3/2020 |
| KR | 10-2020-0095972 A | 8/2020 |

OTHER PUBLICATIONS

Written Opinion (PCT/ISA/237) issued Jan. 19, 2022 by the International Searching Authority in counterpart International Application No. PCT/KR2021/014384.

* cited by examiner

| Air actions Feature Structure Diagram | | | |
|---|---|---|---|
| Air actions<br>: Function group<br>using BT protocol<br>to S Pen | App actions<br>: Function group affecting only<br>currently executed App | Single press | • |
| | | Double press | •• |
| | | App gestures | ← → ↑ ↓ ↻ ↺ |
| | Anywhere actions<br>: Function group operating regardless<br>of App environment unlike App actions | Hold down pen button to(Long press) | ▌ |
| | | Global gestures | ⤴ ⤵ ⤶ ⤷ 〰 |
| | Air pointer* | Laser pointer | |
| | | Highlighter | |
| | A Pen unlock* | | |
| * Function using BT protocol to S Pen but not included in Air action in<br>consideration of Settings structure, affected by Air actions master switch on/off | | | |

FIG. 7

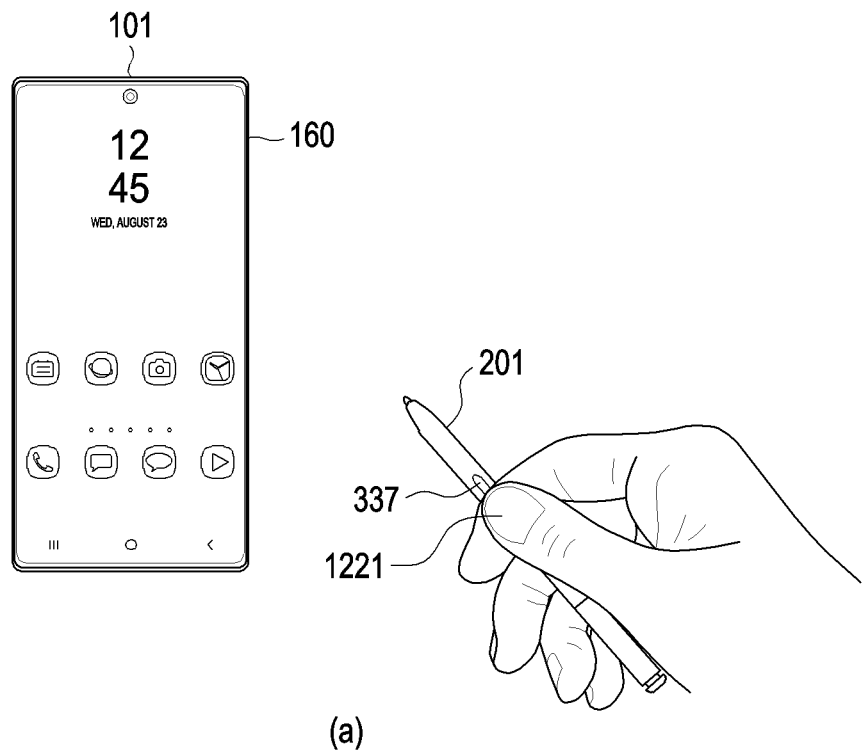
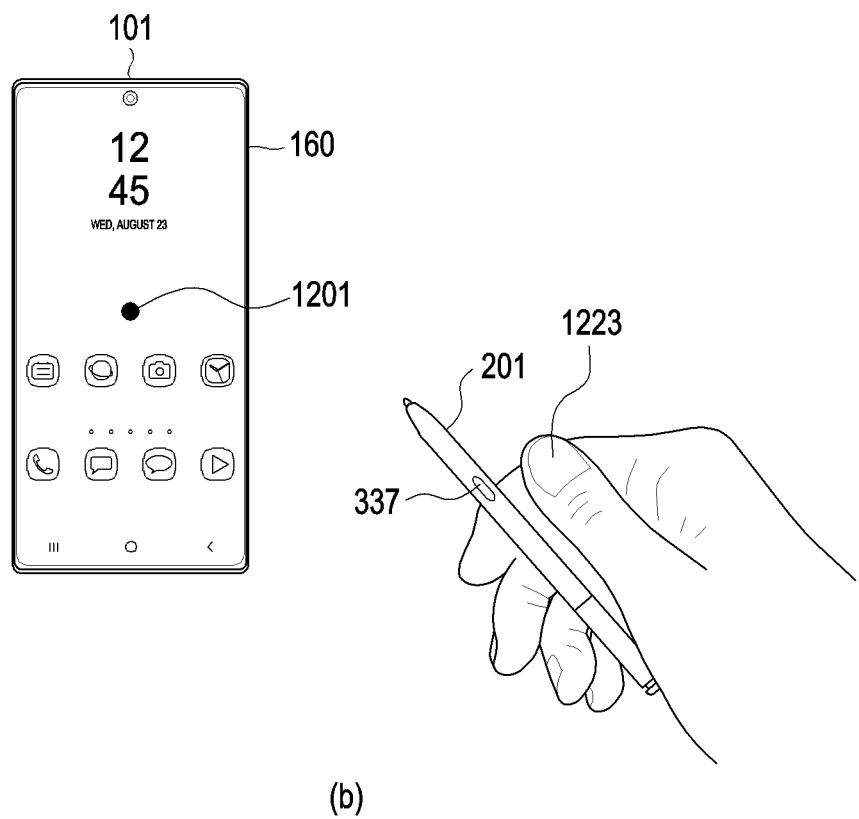
FIG. 12B

ELECTRONIC DEVICE FOR CONTROLLING OPERATION OF ELECTRONIC PEN DEVICE, OPERATION METHOD IN ELECTRONIC DEVICE, AND NON-TRANSITORY STORAGE MEDIUM

CROSS REFERENCES TO RELATED APPLICATIONS

The present application is a bypass continuation of International Application No. PCT/KR2021/014384, filed on Oct. 15, 2021, in the Korean Intellectual Property Office, which claims priority from Korean Patent Application No. 10-2020-0135467, filed on Oct. 19, 2020, in the Korean Intellectual Property Office, the disclosures of which are incorporated herein in their entireties

FIELD

Various embodiments disclosed herein relate to an electronic device for controlling an operation of an electronic pen device, an operation method in an electronic device, and a non-transitory storage medium.

BACKGROUND

Recently, electronic devices have been developed in various forms for user convenience.

As mobile communication services extend to multimedia service areas, a user may use multimedia services as well as voice call or text messaging services through electronic devices. In order to prevent users from inconvenience in using multimedia services, electronic devices are increasingly equipped with large displays. Furthermore, a foldable electronic device having a flexible display disposed thereon has been disclosed.

An electronic device has been developed to have various types of means, such as a mean for operation by another electronic device or an input means for an input interface through which user information is input to another electronic device. The input means may include an electronic pen device (e.g., a stylus pen or a digital pen) having a pen function and user information may be input to an electronic device through a touch screen of the electronic device.

An input method of the electronic pen device may include an electro-magnetic resonance (hereinafter, referred to as EMR) method and a method using a Bluetooth function.

SUMMARY

An existing electronic pen device is connected to an electronic device through Bluetooth and a button needs to be continuously pressed to operate an air action in case of performing air interaction. While pressing the button, in case that the pointer movement and a gesture operation are performed for a long time for the air action motion, the wrist may be stiff or the thumb may be strained, and it may be difficult for a user having hand tremor to perform accurate air pointer movement and selection. Accordingly, the existing electronic device may not accurately control air interaction of the electronic pen device and may not accurately perform an operation desired by a user.

According to various embodiments of the disclosure, there may be provided an electronic device for controlling an operation of an electronic pen device, an operation method in an electronic device, and a non-transitory storage medium so as to accurately perform an operation desired by a user and control air interaction with the electronic pen device.

According to an embodiment disclosed herein, an electronic device for controlling an operation of an electronic pen device may include a communication module, a display module, a memory, and at least one processor electrically connected to the communication module, the display module and the memory, wherein the at least one processor is configured to control the communication module to establish a communication connection with the electronic pen device, switch an operation state of the electronic pen device into an air pointer operation state based on a first signal by a button input of the electronic pen device, acquire location information of the display module, which corresponds to a location or a motion of the electronic pen device, in a state in which the button input is released and the air pointer operation is maintained, control the display module to display an object indicating the air pointer operation, based on feature information of at least one object displayed on the display module and the location information, and execute an operation corresponding to an action event of the electronic pen device.

According to an embodiment, an operation method in an electronic device for controlling an electronic pen device may include an operation of controlling a communication module to establish a communication connection with the electronic pen device, an operation of switching an operation state of the electronic pen device into an air pointer operation state based on a first signal by a button input of the electronic pen device, an operation of acquiring location information of a display module, which corresponds to a location or a motion of the electronic pen device, in a state in which the button input is released and the air pointer operation is maintained, an operation of controlling the display module to display an object indicating the air pointer operation, based on feature information of at least one object displayed on the display module and the location information, and an operation of executing an operation corresponding to an action event of the electronic pen device.

According to an embodiment, in a non-transitory storage medium storing one or more programs, the one or more programs may include executable instructions configured to, when executed by a processor of an electronic device, causes the electronic device to control an electronic pen device may include an operation of controlling a communication module to establish a communication connection with the electronic pen device, switch an operation state of the electronic pen device into an air pointer operation state based on a first signal by a button input of the electronic pen device, acquire location information of a display module, which corresponds to a location or a motion of the electronic pen device, in a state in which the button input is released and the air pointer operation is maintained, control the display module to display an object indicating the air pointer operation, based on feature information of at least one object displayed on the display module and the location information, and execute an operation corresponding to an action event of the electronic pen device.

By the electronic device for controlling an operation of an electronic pen device and the operation method in an electronic device according to an embodiment, an air pointer operation of the electronic pen device may be controlled separately from other air action operations, through an operation state switching operation between the air pointer operations of the electronic pen device. Therefore, without continuously pressing the button of the electronic pen device, a user may perform actions in a state where a button input is released and the air pointer operation is maintained, and thus the embodiment may prevent the user from having strain on the wrist and thumb due to continuous pressing of the button. Moreover, the embodiment may solve the difficulty of accurately selecting and moving an air pointer for a user with hand tremor, and thus allows the user to perform the desired action more accurately.

BRIEF DESCRIPTION OF DRAWINGS

FIG. 7 is a view illustrating an example of feature information of an air action according to an embodiment.

FIG. 12B is a diagram illustrating an operation method according to an embodiment.

In connection with a description of the drawings, like or similar reference numerals may be used for like or similar elements.

DETAILED DESCRIPTION

An electronic device according to various embodiments will be described with reference to attached drawings. The term "user" used in various embodiments may be referred to as a person who uses an electronic device or a device (e.g., an artificial intelligence electronic device) that uses an electronic device.

Figure 1:
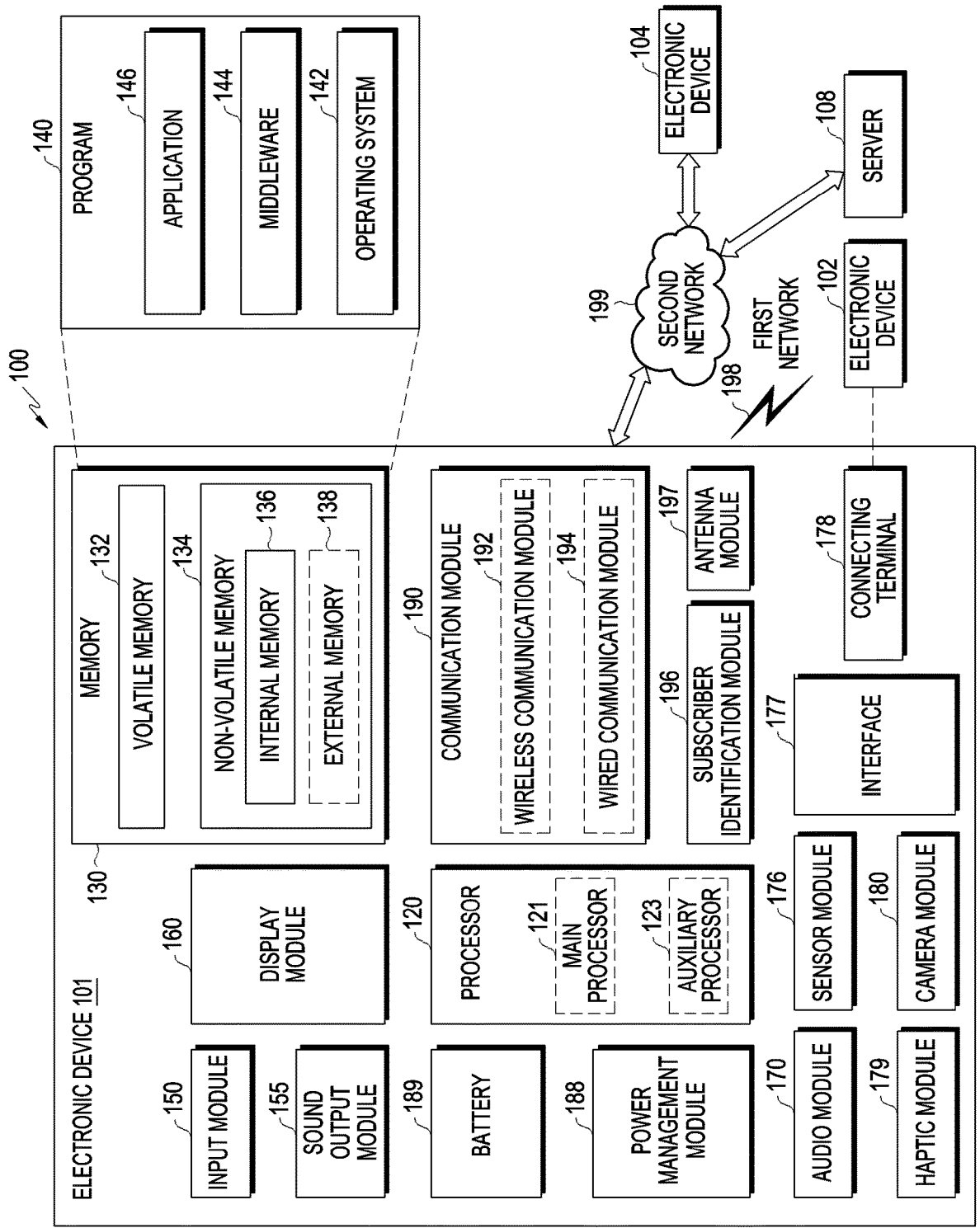
FIG. 1 is a view illustrating a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
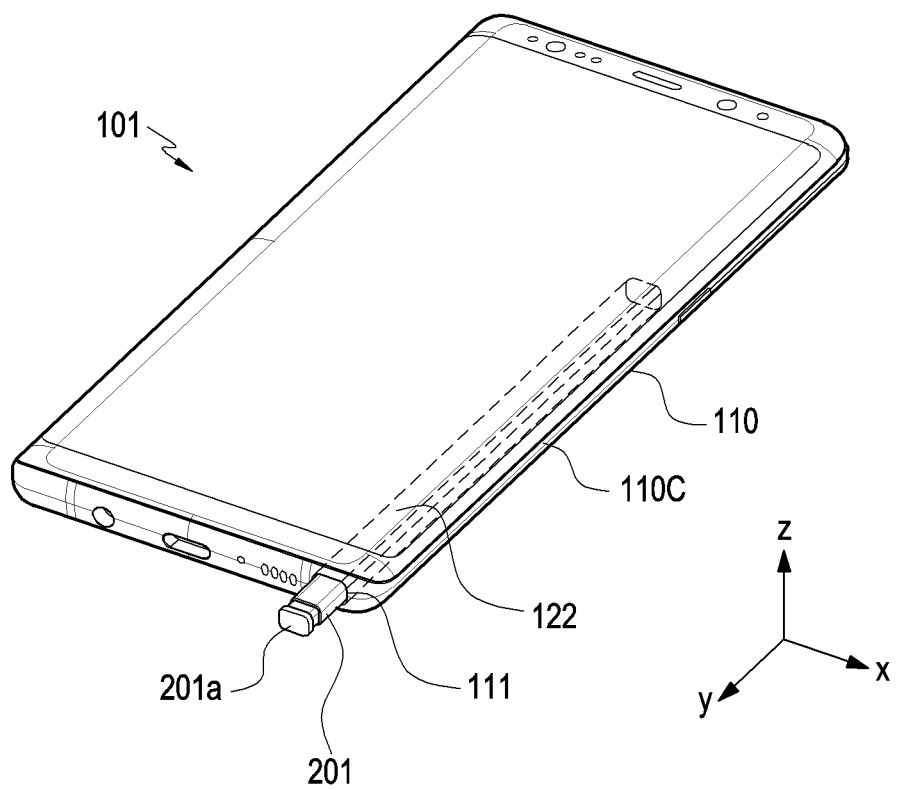
FIG. 2 is a perspective view of an electronic device including a digital pen according to an embodiment of the disclosure.

FIG. 2 is a perspective view of an electronic device including a digital pen of an embodiment.

Referring to FIG. 2, the electronic device 101 of an embodiment may include a configuration shown in FIG. 1 and a structure into which a digital pen 201 (e.g., a stylus pen) may be inserted. The electronic device 101 may include a housing 110 and include a hole 111 at a portion of the housing, for example, a portion of a lateral surface 110C. The electronic device 101 may include a reception space 122 connected to the hole 111 and the digital pen 201 may be inserted into the reception space 122. According to an embodiment described herein, the digital pen 201 may include a button 201a which is pressable at one end thereof so that the digital pen 201 is easily pulled out from the reception space 122 of the electronic device 101. When the button 201a is pressed, a repulsive mechanism (e.g., at least one spring) configured to be associated with the button 201a may operate to dislocate the digital pen 201 from the reception space 122.

Figure 3:
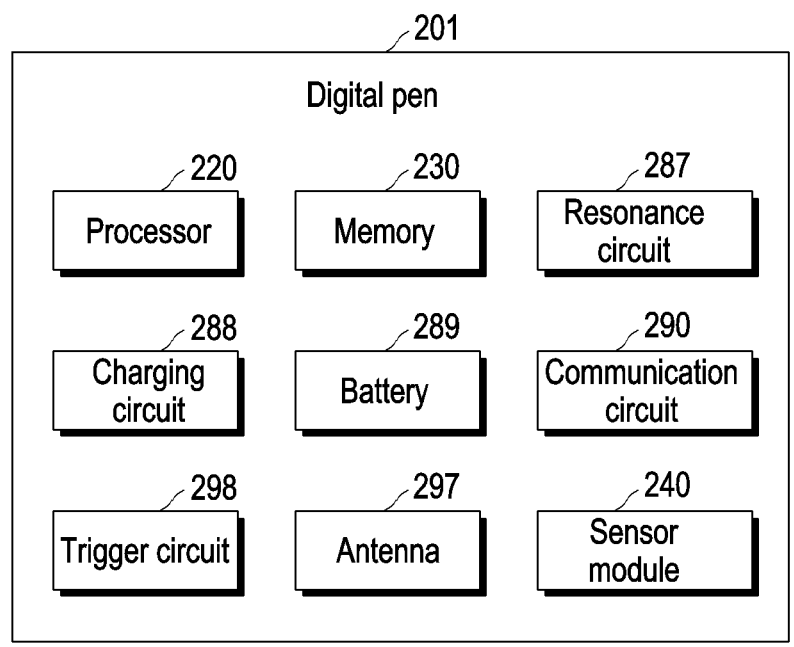
FIG. 3 a block diagram illustrating a digital pen according to an embodiment of the disclosure.

FIG. 3 a block diagram illustrating a digital pen of an embodiment.

Referring to FIG. 3, the digital pen 201 according to an embodiment may include a processor 220, a memory 230, a sensor module 240, a resonance circuit 287, a charging circuit 288, a battery 289, a communication circuit 290, an antenna 297, and/or a trigger circuit 298. In some embodiments, the processor 220, at least a portion of the resonance circuit 287, and/or at least a portion of the communication circuit 290 of the digital pen 201 may be disposed on a printed circuit board or in a chip form. The processor 220, the resonance circuit 287, and/or the communication circuit 290 may be electrically connected to the memory 230, the charging circuit 288, the battery 289, the antenna 297, or the trigger circuit 298. The digital pen 201 according to an embodiment may include only a resonance circuit and a button.

The processor 220 may include a generic processor configured to execute a customized hardware module or software (e.g., an application program). The processor may include a hardware component (function) or software element (program) including at least one of various sensors, a data measurement module, an input/output interface, a module for managing a state or environment of the digital pen 201, or a communication module which is provided in the digital pen 201. The processor 220 may include, for example, one of hardware, software, or firmware, or a combination of two or more thereof. According to an embodiment, the processor 220 may receive a proximity signal corresponding to an electromagnetic field signal generated from a digitizer 160 of the electronic device 101 through the resonance circuit 287. When the proximity signal is identified, the resonance circuit 287 may be controlled to transmit an electro-magnetic resonance (EMR) input signal to the electronic device 101.

The memory 230 may store information related to an operation of the digital pen 201. For example, the information may include information for communication with the electronic device 101 and frequency information related to an input operation of the digital pen 201.

The resonance circuit 287 may include at least one of a coil, an inductor, or a capacitor. The resonance circuit 287 may be used to generate a signal including a resonance frequency by the digital pen 201. For example, in order to generate the signal, the digital pen 201 may employ at least one of an electro-magnetic resonance (EMR) method, an active electrostatic (AES) method, or an electrically coupled resonance (ECR). When the digital pen 201 transmits a signal by the EMR method, the digital pen 201 may generate a signal including a resonance frequency, based on an electromagnetic field generated from an inductive panel of the electronic device 101. When the digital pen 201 transmits a signal by the AES method, the digital pen 201 may generate a signal by using capacity coupling of the electronic device 101. When the digital pen 201 transmits a signal by the ECR method, the digital pen 201 may generate a signal including a resonance frequency, based on an electromagnetic field generated from a capacitive device of the electronic device. According to an embodiment, the resonance circuit 287 may be used to change a strength or frequency of an electromagnetic field according to an operation state of a user. For example, the resonance circuit 287 may provide a frequency to recognize a hovering input, drawing input, button input, or erasing input.

When connected to the resonance circuit 287 based on a switching circuit, the charging circuit 288 may rectify a resonance signal generated by the resonance circuit 287 into a DC signal and provide the DC signal to the battery 289. According to an embodiment, the digital pen 201 may identify whether the digital pen 201 is inserted into the electronic device 101 by using a voltage level of the DC signal detected by the charging circuit 288.

The battery 289 may be configured to store power required by an operation of the digital pen 201. The battery may include, for example, a lithium-ion battery or a capacitor, and may be rechargeable or replaceable. According to an embodiment, the battery 289 may be charged by using power (e.g., a DC signal (DC power)) provided from the charging circuit 288.

The communication circuit 290 may be configured to perform wireless communication between the digital pen 201 and the communication module 190 of the electronic device 101. According to an embodiment, the communication circuit 290 may transmit state information and input information of the digital pen 201 to the electronic device 101 by using a near-field communication method. For example, the communication circuit 290 may transmit, to the electronic device 101, direction information (e.g., motion sensor data) of the digital pen 201 acquired through the trigger circuit 298, voice information input through a microphone, or remaining capacity information of the battery 289. By way of example, the near-field communication method may include at least one of Bluetooth, Bluetooth low energy (BLE), or wireless LAN.

The antenna 297 may be used to transmit/receive a signal or power to/from the outside (e.g., the electronic device 101). According to an embodiment, the digital pen 201 may include multiple antennas 297 and may select at least one antenna 297 suitable for a communication method from among the multiple antennas. Through the selected at least one antenna 297, the communication circuit 290 may exchange a signal or power with an external electronic device.

The trigger circuit 298 may include at least one button or a sensor circuit. According to an embodiment, the processor 220 may identify a button input method (e.g., touching or pressing) or type (e.g., an EMR button of a BLE button) of the digital pen 201. According to an embodiment, the sensor circuit may generate an electrical signal or a data value corresponding to an internal operation state or external environment state of the digital pen 201. For example, the sensor circuit may include at least one of a motion sensor, a battery capacity level sensor, a pressure sensor, a light sensor, a temperature sensor, a geomagnetic sensor, and a biosensor. According to an embodiment, the trigger circuit 298 may transmit a trigger signal to the electronic device 101 by using a signal through a button input or a sensor.

Figure 4:
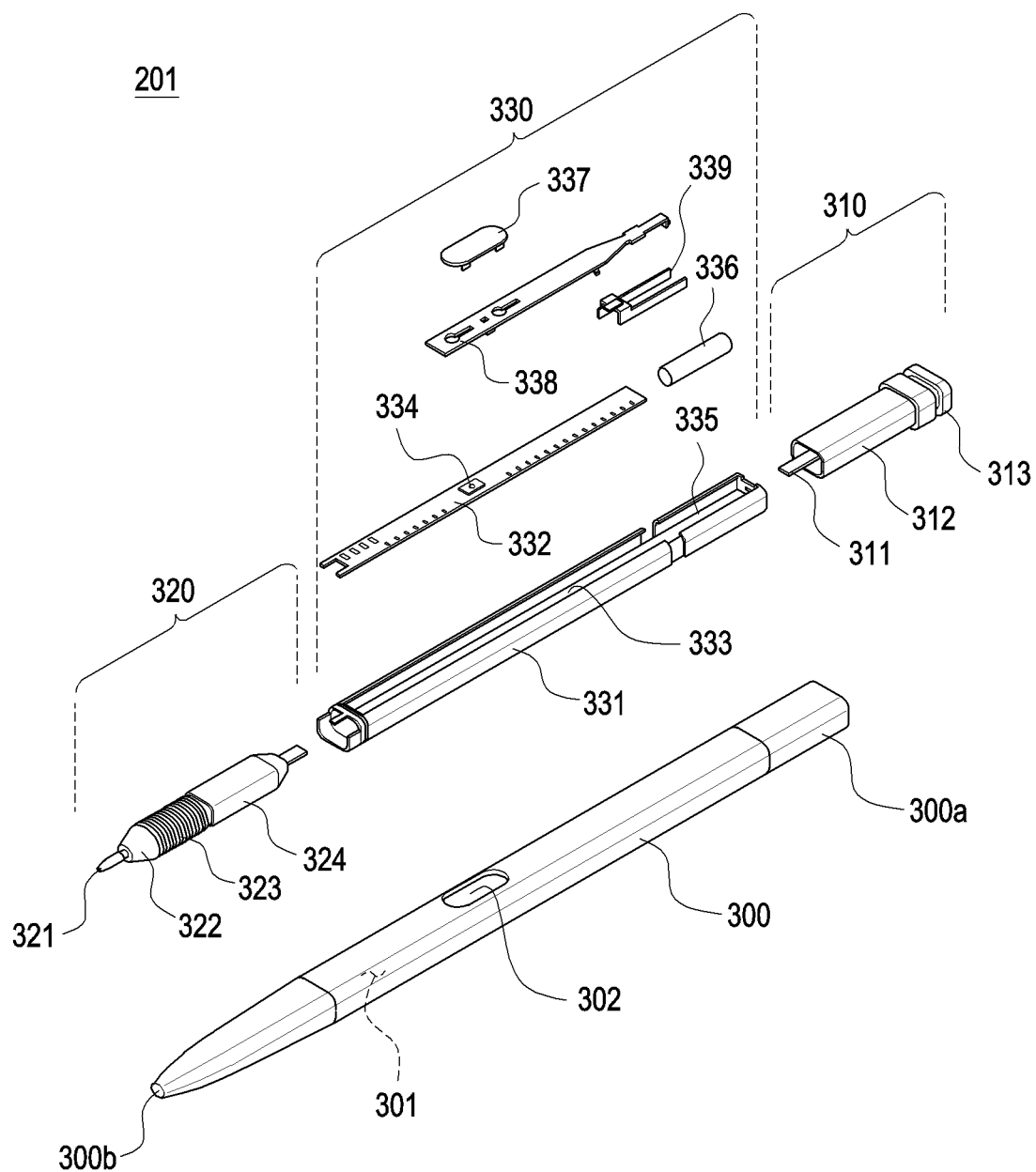
FIG. 4 is an exploded perspective view of a digital pen according to an embodiment of the disclosure.

FIG. 4 is an exploded perspective view of a digital pen according to an embodiment.

Referring to FIG. 4, the digital pen 201 may include a pen housing 300 for forming the exterior of the digital pen 201 and an inner assembly inside the pen housing 300. In an embodiment disclosed herein, the inner assembly may include all of various components mounted inside the pen and may be inserted into the pen housing 300 through one assembly operation.

The pen housing 300 may have a shape extending between a first end 300*a* and a second end 300*b* and have a reception space 301 therein. A sectional view of the pen housing 300 may have a oval shape with a major axis and a minor axis and may be formed to have an cylindric shape as a whole. The reception space 122 of the electronic device 101 may be formed to have an elliptical section to correspond to the shape of the pen housing 300. The pen housing 300 may include a synthetic resin (e.g., plastic) and/or a metal material (e.g., aluminum). According to an embodiment, the second end 300*b* of the pen housing 300 may include a synthetic resin material.

The inner assembly may have an elongated shape to correspond to the shape of the pen housing 300. The inner assembly may be divided into three major components along the longitudinal direction. For example, the inner assembly may include an ejection member 310 disposed at a location corresponding to the first end 300a of the pen housing 300, a coil part 320 disposed at a location corresponding to the second end 300b of the pen housing 300, and a circuit board part 330 disposed at a location corresponding to a body of the housing.

The ejection member 310 may include a component to eject the digital pen 201 from the reception space 122 of the electronic device 101. According to an embodiment, the ejection member 310 may include a shaft 311, an ejection body 312 disposed around the shaft 311 and forming the overall exterior of the ejection member 310, and a button part 313. When the inner assembly is completely inserted into the pen housing 300, a portion including the shaft 311 and the ejection body 312 may be surrounded by the first end 300a of the pen housing 300 and the button part 313 (e.g., 201a in FIG. 2) may be exposed to the outside of the first end 300a. In the ejection body 312, multiple components which are not described in the drawings, for example, cam members or elastic members are arranged to form a push-pull structure. In an embodiment, the button part 313 may be substantially coupled to the shaft 311 and may reciprocate with respect to the ejection body 312. According to various embodiments, the button part 313 may include a button having a catching structure to allow a user to pull out the digital pen 201 by using a fingernail. According to an embodiment, the digital pen 201 may include a sensor for detecting reciprocating movement of the shaft 311 and provide another input method.

The coil part 320 may include a pen tip 321 exposed to the outside of the second end 300b when the inner assembly is completely inserted into the pen housing 300, a packing ring 322, a coil 323 wound multiple times, and/or a writing pressure detection part 324 for acquiring a pressure change according to pressure of the pen tip 321. The packing ring 322 may include epoxy, rubber, urethane or silicone. The packing ring 322 may be provided for the purpose of waterproofing and dustproofing and may protect the coil part 320 and the circuit board part 330 from water or dust. According to an embodiment, the coil 323 may form a resonance frequency in a configured frequency band (e.g., 500 kHz) and may be combined with at least one element (e.g., capacitive element (capacitor)) to adjust the resonance frequency formed by the coil 323 within a predetermined range.

The circuit board 330 may include a printed circuit board 332, a base 331 surrounding at least one surface of the printed circuit board 332, and an antenna. According to an embodiment, a board seating part 333 on which the printed circuit board 332 is disposed may be formed on an upper surface of the base 331 and the printed circuit board 332 may be fixed while being seated on the board seating part 333. According to an embodiment, the printed circuit board 332 may include an upper side surface and a lower side surface, a switch 334 or a variable capacitance capacitor connected to the coil 323 may be disposed on the upper side surface, and a charging circuit, a battery, or a communication circuit may be disposed on the lower side surface. The battery may include an electric double layered capacitor (EDLC). The charging circuit may be located between the coil 323 and the battery and include a voltage detector circuit (circuitry) and a rectifier.

The antenna may include an antenna structure 339 shown in FIG. 4 and/or an antenna embedded in the printed circuit board 332. According to various embodiments, the switch 334 may be provided on the printed circuit board 332. A side button 337 provided in the digital pen 201 may be used to press the switch 334 and exposed through a lateral side opening 302 of the pen housing 300. The side button 337 may be supported by a support member 338 and may be restored or maintained in a state in which the side button 337 is placed in a predetermined location by an elastic restoring force provided by the support member 338 when there is no external force applied to the side button 337.

The printed circuit board 330 may include other packing rings such as an O-ring. For example, O-rings formed of an elastic body may be disposed at both ends of the base 331 to form a sealing structure between the base 331 and the pen housing 300. In some embodiments, the support member 338 may partially come in close contact with an internal wall of the pen housing 300 around the lateral side opening 302 to form a sealing structure. By way of example, the printed circuit board 330 may form a waterproofing and dustproofing structure as the packing ring 322 of the coil part 320.

The digital pen 201 may include a battery seating part 335 on which the battery 336 is disposed on an upper surface of the base 331. The battery 336 which may be mounted on the battery seating part 335 may include, for example, a cylinder type battery.

The digital pen 201 may include a microphone. The microphone may be directly connected to the printed circuit board 332 or connected to a separate flexible printed circuit board (FPCB) connected to the printed circuit board 332. According to various embodiments, the microphone may be disposed in a location parallel with the side button 337 in a longitudinal direction of the digital pen 201.

Figure 5:
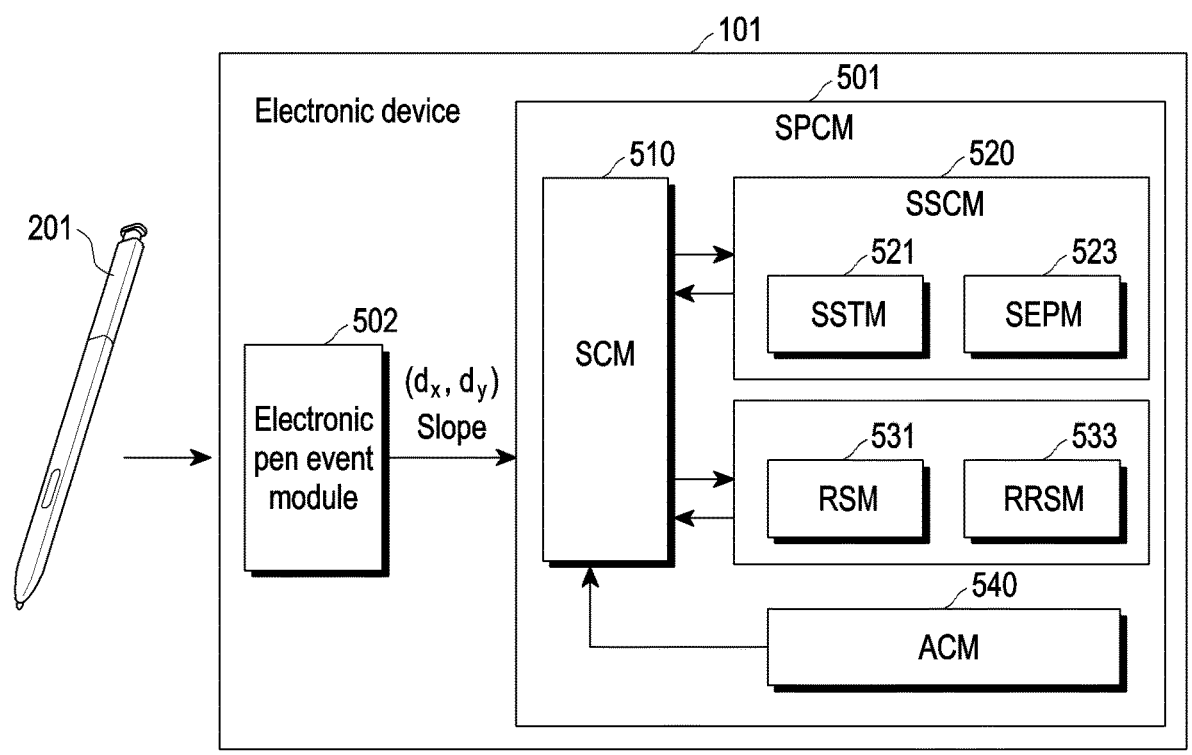
FIG. 5 is a view illustrating an exemplary configurational of an electronic device according to an embodiment.
Figure 6:
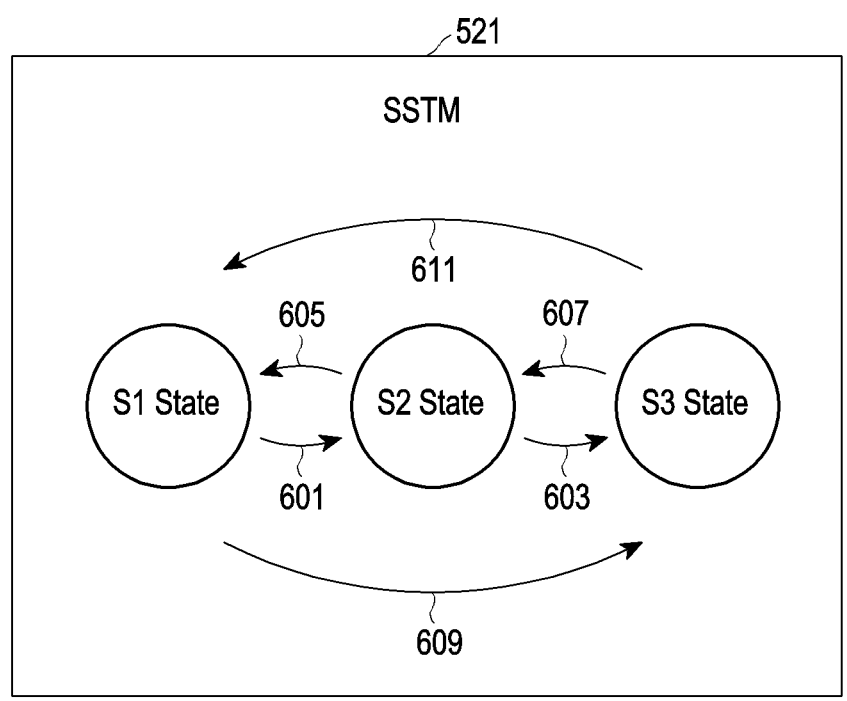
FIG. 6 is a diagram illustrating operation state switching of an electronic pen device according to an embodiment.
Figure 8:
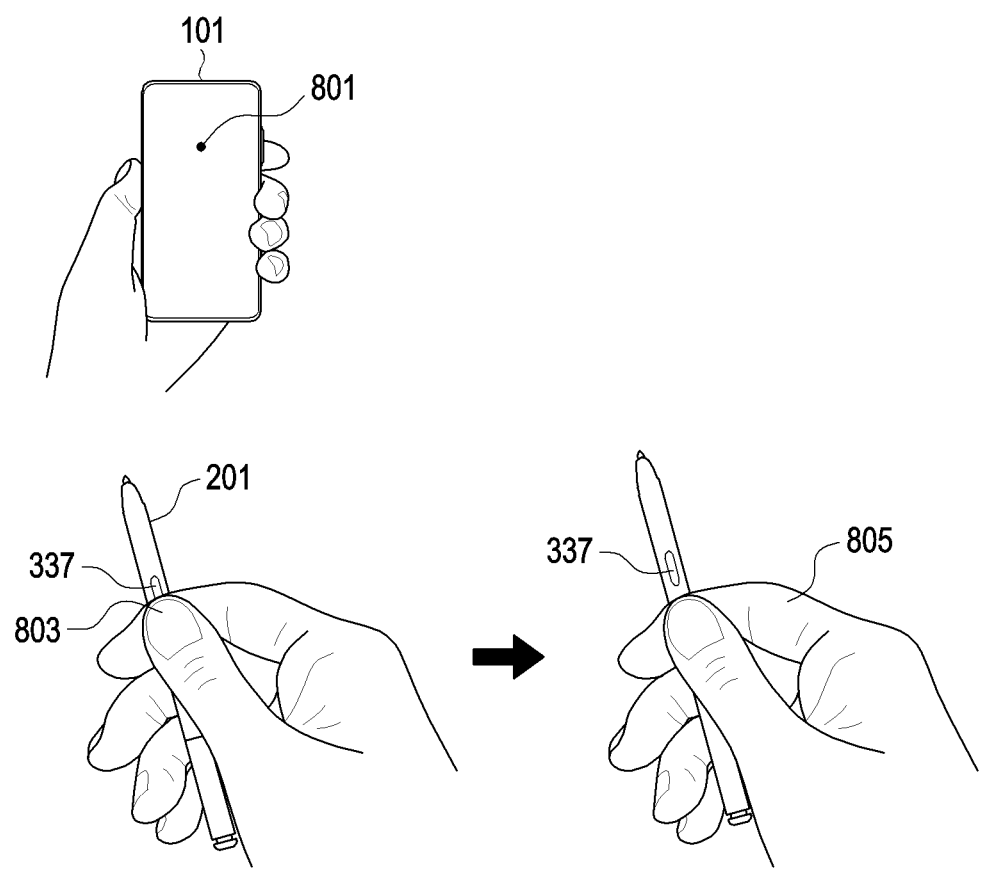
FIG. 8 is a diagram illustrating operation state switching of an electronic pen device according to an embodiment.
Figure 9:
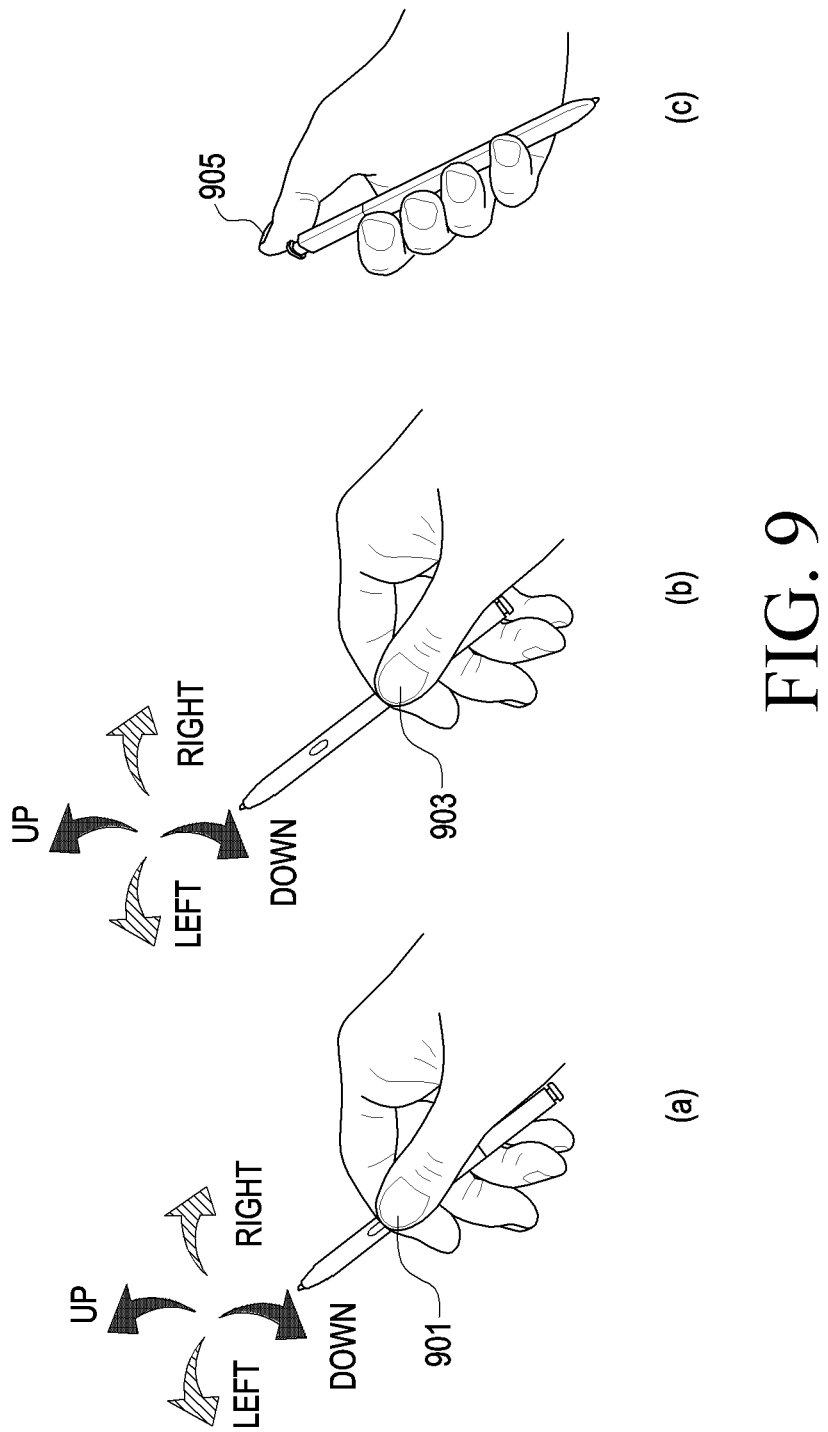
FIG. 9 is a diagram illustrating operation state switching of an electronic pen device according to an embodiment.

FIG. 5 is a view illustrating a configurational example of an electronic device according to various embodiments, FIG. 6 is a view illustrating operation state switching of an electronic pen device according to an embodiment, FIG. 7 is a view illustrating an example of feature information of an air action according to an embodiment, FIG. 8 is a view illustrating operation state switching of an electronic pen device according to an embodiment, and FIG. 9 is a view illustrating operation state switching of an electronic pen device according to an embodiment.

Referring to FIG. 1 to FIG. 4 and FIG. 5, the electronic device 101 according to an embodiment may be connected to an electronic pen device 201 (e.g., the digital pen 201 or a stylus pen in FIG. 2, FIG. 3, and FIG. 4) through near-field communication (e.g., Bluetooth communication). The electronic pen device 201 may control activation of at least one sensor (e.g., an acceleration sensor and/or a gyro sensor) included in a sensor module (e.g., the sensor module 240 in FIG. 3) according to whether to be inserted into the electronic device 101 or a button input, and based on the button input, transmit sensing data detected by the sensor module 240 to the electronic device 101. For example, the acceleration sensor may be activated according to detachment of the electronic pen device 201 from a reception space (e.g., the reception space 122 in FIG. 2) of the electronic device 101 and may detect acceleration information based on the motion of the electronic pen device 201. For example, the gyro sensor may be activated according to the button input of the electronic pen device 201 and may detect rotation information based on the motion of the electronic pen device 201.

The processor 120 of the electronic device 101 according to an embodiment may be electrically connected to the communication module 190, the display 160, and the memory 130 and configured to control air interaction of the electronic pen device 201 interlinking with the electronic pen device 201.

The processor 120 of the electronic device 101 according to an embodiment may manage connection with the electronic pen device 201 by a module for managing the electronic pen device 201 in a software framework layer. A Bluetooth signal (e.g., an BLE event) received by the electronic pen device 201 may not be transmitted directly to an application layer and may be converted into KeyEvents and transferred by a framework to an application. Therefore, an event of the electronic pen device 201 may be processed using existing KeyEvent-Callback without additional other interfaces in the application layer.

The processor 120 of the electronic device 101 according to an embodiment may be configured by including, as a software module, an electronic pen pointer control management module (stylus pointer control manager (SPCM)) 501 configured between the application layer and the framework layer, and an electronic pen event module (stylus event) 502 for identifying an event caused by an air action of the electronic pen device 201, configured in the framework, and converting the identified event into KeyEvents. The electronic pen pointer control management module 501 may be configured to manage an air action state of the electronic pen device 201 and perform control over shaking of the electronic pen device 201. The electronic pen pointer control management module 501 may be configured by including an electronic pen coordinate mapping module (stylus state coordinate module (SCM)) 510 and an electronic pen state switching management manager (stylus state control manager (SSCM)) 520. The electronic pen pointer control management module 501 may be configured by including a rotation module (rotation state module (RSM)) 531, a scan rate module (refresh rate state (RRSM)) 533 of the electronic device, and an application analysis module (application object module (ACM)) 540 which manage state information of the electronic device and interlink with the electronic pen coordinate mapping module (stylus state coordinate module (SCM)) 510 to analyze and correct the coordinate according to shaking of the electronic pen device 210. The application analysis module 540 may analyze features of objects of an application displayed on the display module 160.

The electronic pen coordinate mapping module 510 may be configured to identify coordinate information of the electronic pen device 201 in accordance with state information, scan rate information, and application information of the electronic device and predict a target object displayed on the display module 160. The electronic pen coordinate mapping module 510 may perform control (e.g., a Gimbal effect) over shaking in case that a pointer moves to a target object in accordance with a moving direction of an air pointer operation (air action::pointer) to correspond to a coordination system of the electronic pen device 201 to process an object corresponding to the movement coordinate information to be displayed on a display and expand an area in a layout in accordance with the application information in an operation of selecting an object by an air action so as to execute an event. The event to be executed may be executed in case of staying more than N second(s) in the coordinates where the event occurs.

The electronic pen state switching management manager (stylus state control manager (SSCM)) 520 may be configured by including an electronic pen state switching module (stylus state transition module (SSTM)) 521 and an electronic pen event processing module (stylus event processing module (SEPM)) 523, perform a function of processing an operation that executes an air action by pressing a button (e.g., the button 337 in FIG. 4) of the electronic pen device 201, and control operation switching by the SSTM 521 in response to an event of the SEPM 523 so that when the button of the electronic pen device 201 is pressed and executed, the air pointer operation (air action::pointer) may be executed and maintained without pressing the button in order to prevent strain on the thumb.

According to an embodiment, the processor 120 may control the communication module to establish communication connection with the electronic pen device 201 by using a near-field communication method (e.g., Bluetooth (Bluetooth low energy (BLE)). When the electronic pen device 201 is in a detached state and located outside a predetermined range from the electronic device 101, the processor 120 may operate in a Bluetooth mode by a Bluetooth control module of a processor (e.g., the processor 220 in FIG. 3) of the electronic pen device 201.

According to an embodiment, the processor 120 may perform an event identification operation for starting an operation for air interaction control of the electronic pen device 201. For example, when the electronic pen device 201 is converted into a Bluetooth mode and a signal (e.g., a first signal) by a designated button input is received from the electronic pen device 201, the processor 120 may start an operation for air interaction control and perform an operation of switching into an air pointer operation (air action:: pointer) for air interaction control according to the air pointer operation (air action::pointer).

According to an embodiment, the processor 120 may be configured to switch an operation state of the electronic pen device 201 into an air pointer operation state based on the first signal (e.g., a Bluetooth signal) by a button input of the electronic pen device 201. For example, when the electronic pen device 201 receives a Bluetooth signal, the processor 120 may transfer an event (e.g., KeyEvent) corresponding to the Bluetooth signal received by the electronic pen event module 502 to the electronic pen device switching management manager 501, and when the event transferred from the electronic pen state switching management manager 501 is identified to be an event related to the air pointer operation, switch the operation state of the electronic pen device 201 into the air pointer operation state (e.g., S3 state). As the air pointer operation is processed by the electronic pen state switching management manager 501, the air pointer operation may be maintained even when the button input is released without performing an operation corresponding to an event according to a location or a motion of the pointer in a state in which the button input of the electronic pen device 201 is continuously pressed. For example, the air pointer operation (air action::pointer) may include a laser pointer state S3-1 (e.g., a first air pointer operation state), a highlighter state S3-2 (e.g., a second air pointer operation state), and an up/down/left/right icon (scroll) state (e.g., S3-3) (e.g., a third air pointer operation state) and state switching may occur among states.

According to an embodiment, in a state in which the button input is released and the air pointer operation is maintained, when a second signal related to at least one of the button input or a gesture input is received from the electronic pen device 201, the processor 120 may be configured to perform switching into the laser pointer state S3-1 (e.g., the first air pointer operation). In a state in which the button input is released and the air pointer operation is maintained, when a third signal related to at least one of the button input or gesture input is received from the electronic pen device, the processor 120 may be configured to perform switching into the highlighter state S3-2 (e.g., the second air pointer operation state). In a state in which the button input is released and the air pointer operation is maintained, when a fourth signal related to at least one of the button input or gesture input is received from the electronic pen device, the processor 120 may be configured to perform switching into the up/down/left/right icon (scroll) state (e.g., S3-3) (e.g., the third air pointer operation state). The second signal, the third signal, and the fourth signal received from the electronic pen device 201 may each include information related to at least one of a predetermined button input or predetermined gesture input and may be converted into KeyEvents by the electronic pen event module 502 to be transferred to the electronic pen pointer control management module (SPCM) 501 as an event. For example, in relation to the button input designated by the electronic pen event module 502, the processor 120 may cause a hold down event indicating a state in which a button (e.g., the button 337 in FIG. 4) of the electronic pen device 201 is pressed or a release event indicating a state in which the button is released. For example, in relation to the gesture input designated by the electronic pen event module 502, the processor 120 may cause an event related to the motion of the electronic pen device 201. The gesture input may correspond to the motion of the electronic pen device 201 corresponding to sensing information detected by at least one sensor (e.g., an acceleration sensor and/or gyro sensor) of the electronic pen device 201. For example, an event for switching an operation state may correspond to a predetermined pattern (e.g., a short button input+a long button input n sec) or the like.

According to an embodiment, as shown in FIG. 6, when Bluetooth connection with the electronic pen device 201 is established, the processor 120 may perform switching 601 from a connection release state (e.g., S1 state) into an air gesture operation state (e.g., S2 state) or switching 609 from the connection release state (e.g., S1 state) into an air pointer operation state (e.g., S3 state). As shown in FIG. 6, the processor 120 may be configured to perform switching 603 from the air gesture state (e.g., S2 state) into the air pointer operation (air action::pointer) state (e.g., S3 state). As shown in FIG. 6, when Bluetooth connection with the electronic pen device 201 is released or the Bluetooth mode is ended, the processor 120 may perform switching 605 from the air gesture operation state (e.g., S2 state) into the connection release state (e.g., S1 state) or switching 611 from the air pointer operation state (e.g., S3 state) into the connection release state (e.g., S1 state). The Bluetooth mode may be ended when an air pointer tool bar is ended or the electronic pen device 201 is inserted into the electronic device 101. As shown in FIG. 6, when an event according to a signal by a designated button input or gesture input corresponding to the air gesture operation is identified, the processor 120 may perform switching 607 from the air pointer operation state (e.g., S3 state) into the air gesture operation state (e.g., S2 state).

According to an embodiment, when communication connection with the electronic pen device 601 is established, the processor 120 may acquire sensing information detected by at least one sensor (an acceleration sensor or gyro sensor) of the electronic pen device and identify corresponding feature information among designated multiple pieces of air action feature information as shown in FIG. 7, based on the first signal by the button input and the acquired sensing information. When the identified feature information corresponds to the air pointer operation, the processor 120 may perform switching into the air pointer operation state (e.g., S3 state). When the identified feature information does not correspond to the air pointer operation, the processor 120 may switch the operation state of the electronic pen device into the air gesture operation state (e.g., S2 state) which is another air operation state. As shown in FIG. 7, the designated multiple pieces of air action feature information may correspond to a function group using a Bluetooth protocol of the electronic pen device 201 and may be designated by including application actions including a single press, a double press, and an app gestures which are functions only affecting a currently executing application, anywhere actions including a hold down pen button (long press) and global gestures which are functions operating regardless of an application environment, an air pointer, and unlocking (S pen unlock).

According to an embodiment, as shown in FIG. 8, when performing switching into the air pointer operation state based on a signal by the button input 803, the processor 120 may control to display an object 801 indicating a pointer (air action::pointer) by the air pointer operation on the display module 160 and may control the display module 160 to maintain the display of the object 801 indicating the pointer (air action::pointer) since the air pointer operation is maintained even if the button input is released 805.

According to an embodiment, the processor 120 may be configured to acquire location information of the display module 160 corresponding to a location or a motion of the electronic pen device 201 in a state in which the button input of the electronic pen device 201 is released and the air pointer operation is maintained. The location information may be acquired based on sensing information acquired by detecting a location or a motion of the electronic pen device 201 by at least one sensor (e.g., acceleration sensor and/or gyro sensor) of the electronic pen device 201.

According to an embodiment, when the location information (e.g., coordinate information) is acquired, the processor 120 may adjust a pointer movement speed according to an aspect ratio of a screen of a display module (e.g., the display module 160 in FIG. 1). For example, it may be at least one of screen resolution information (e.g., HD+(1600×720), FHD+(2400×1080) or WQHD+(3200×1440)) or a refresh rate (e.g., 60 Hz, 120 Hz, and the like). For example, the electronic device may control a pointer movement speed according to an aspect ratio (resolution) of a display screen. For example, the electronic device may control coordinates of a moving section of the pointer (air action::pointer) of the air pointer operation by accelerating a pointer moving speed a little bit when the pointer is moved in a longer direction of the horizontal or vertical length of the display screen. For example, the electronic device may control the pointer to move slightly more when moving vertically than moving horizontally in a portrait mode and move slightly more when moving horizontally than moving vertically in a landscape mode. For example, assuming that a pen is moved by 10 cm horizontally and 10 cm vertically in the portrait mode, the pointer on a normal screen may be moved by D pixels horizontally and D pixels vertically, but according to an embodiment, the pointer may be moved D pixels horizontally and M pixels (e.g., M=D*R, R>1.0) vertically. A vertical axis is longer in the portrait mode and thus the Y-axis movement value may be greater than the horizontal axis movement value. Accordingly, regardless of the portrait/landscape mode of a display screen, the pointer may be moved easily in a direction of a long axis of the screen. For example, the electronic device may move with acceleration while using a method of multiplying the motion value by a fixed constant value in the direction of the long axis.

According to an embodiment, when acquiring the location information (e.g., coordinate values), the processor 120 may determine a movement feature of the electronic pen device in response to the air action feature information and determine the coordinates received from the electronic pen device 201 as location information in response to the determined movement feature.

According to an embodiment, in response to a hand grip method, the processor 120 may receive slope information of the electronic pen device based on sensor information detected by at least one sensor of the electronic pen device. The at least one sensor may be an acceleration sensor and/or a gyro sensor, and the gyro sensor may include 3 DOF (axis), 6 DOF, or 9 DOF (axis). For example, multi-coordinates by 6 DOF or 9 DOF may be used in a virtual reality (VR).

According to an embodiment, the processor 120 may be configured to control the display module 160 to display an object indicating the air pointer operation based on the location information and feature information of at least one object displayed on the display module 160 and perform an operation corresponding to an action event in response to reception of the action event of the electronic pen device 201. When at least one application is displayed on the display module 160, the processor 120 may be configured to analyze a feature of at least one object included in the application by the electronic pen pointer management module 501 and perform an operation of determining a target object. The processor 120 may analyze a feature of objects included in the application based on feature information of the application displayed on the display module 160. The processor 120 may identify objects (e.g., at least one of a button, an input field, a slide button, or a URL link) controllable by the air pointer operation and map information of a location in which each of identified objects is displayed thereto to store the identified objects in the memory 130. The processor 120 may identify a moving direction of the pointer moving in response to the motion (movement) of the electronic pen device 201 based on the feature information with respect to at least one object analyzed in at least one application displayed on the display module 160 and predict a target object located in the identified direction.

According to an embodiment, the processor 120 may acquire location values (e.g., coordinate values) according to horizontal or vertical shaking of the electronic pen device caused by hand tremor of a user, correct (or model) the acquired location values by using a linear regression analysis technique (or multiple linear regression analysis technique) which models linear correlation, and predict a target object located in the moving direction of the electronic pen device 201. The processor 120 may correct display location values (e.g., coordinate values) of the pointer (air action:: pointer) according to shaking to correspond to a linear trajectory (e.g., linear regression) by using a linear regression analysis technique to control the shaking and determine a target object. For example, the processor 120 may predict a location of the target object by predicting a moving direction according to a linear trajectory to determine the target object.

According to an embodiment, as shown in parts (a), (b), and (c) of FIG. 9, the electronic device 101 may receive a signal with respect to a button input (e.g., hold down) or a button input release (e.g., release event) by using a button input 901 of the electronic pen device 201, a touch input 903 on a portion of the electronic pen device 201, or a trigger button input 905 of the electronic pen device 201. According to an embodiment, in a state in which the air pointer operation state S3 is activated, a tab event of interaction for the button input (e.g., hold down) or the button input release (e.g., release event) may occur.

According to an embodiment disclosed herein, an electronic device (e.g., the electronic device 101 in FIG. 1) for controlling an operation of an electronic pen device (e.g., the digital pen 201 or stylus pen in FIG. 2, FIG. 3, and FIG. 4) may include a communication module (e.g., the communication module 190 in FIG. 1), a display module (e.g., the display module 160 in FIG. 1), a memory (e.g., the memory 130 in FIG. 1), and at least one processor (e.g., the processor 120 in FIG. 1) electrically connected to the communication circuit, the display module, and the memory storing instructions executable by the at least one processor, wherein the at least one processor is configured to control the communication module to establish a communication connection with the electronic pen device, switch an operation state of the electronic pen device into an air pointer operation state based on a first signal by a button input of the electronic pen device, acquire location information of the display module, which corresponds to a location or a motion of the electronic pen device, in a state in which the button input is released and the air pointer operation is maintained, control the display module to display an object indicating the air pointer operation, based on feature information of at least one object displayed on the display module and the location information, and execute an operation corresponding to an action event of the electronic pen device.

According to an embodiment, communication connection with the electronic pen device may be established by using a Bluetooth communication method.

According to an embodiment, the at least one processor may be configured to, when a second signal related to at least one of the button input or gesture input is received from the electronic pen device in a state in which the button input is released and the air pointer operation is maintained, perform switching into a first air pointer operation state, when a third signal related to at least one of the button input or gesture input is received in a state in which the button input is released and the air pointer operation is maintained, perform switching into a second air pointer operation state, and when a fourth signal related to at least one of the button input or gesture input is received in a state in which the button input is released and the air pointer operation is maintained, perform switching into a third air pointer operation state.

According to an embodiment, the at least one processor may be configured to, when communication connection with the electronic pen device is established, acquire sensing information detected by at least one sensor of the electronic pen device, identify feature information of a designated air action based on the first signal and the sensing information, when the identified feature information corresponds to the air pointer operation, map the air action of the electronic pen device to the air pointer operation, and perform switching into the air pointer operation.

According to an embodiment, the at least one processor may be configured to, when the identified feature information does not correspond to the air pointer operation, switch the operation state of the electronic pen device into an air gesture operation state.

According to an embodiment, the at least one processor may be configured to, when communication connection with the electronic pen device is released, switch the operation state of the electronic pen device into a communication connection release state in the air pointer operation state.

According to an embodiment, the at least one processor may be configured to, in case of acquiring the location information, control a pointer movement speed by the air pointer operation based on the width or height ratio of a screen of the display module, screen resolution information, or the refresh rate of the screen.

According to an embodiment, the at least one processor may be configured to analyze the feature information of the at least one object displayed on the display module, identify at least one object controllable by the air pointer operation based on the analyzed feature information, map identification information of the identified at least one object to the location information of the display module on which the identified at least one object is displayed to be stored in the memory, and identify a target object located in the moving direction of the electronic pen device from the identified at least one object.

According to an embodiment, the at least one processor may be configured to acquire location values according to shaking of the electronic pen device caused by hand tremor of a user, correct the acquired location values by using a linear regression analysis technique, and predict a target object located in the moving direction of the electronic pen device based on the corrected location values.

Figure 10:
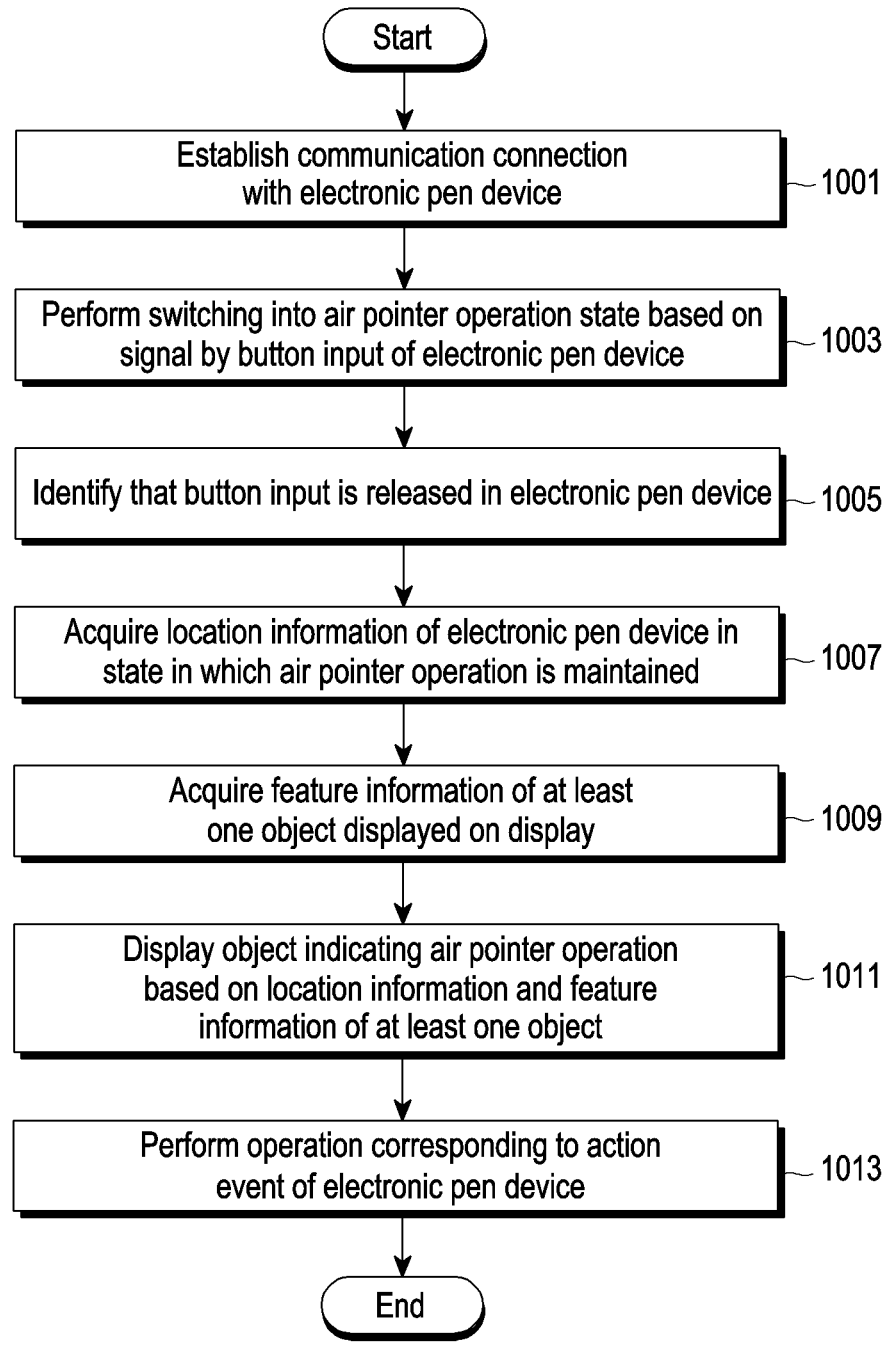
FIG. 10 is a flow diagram illustrating an example of an operation method according to an embodiment.

FIG. 10 is a view illustrating an example of an operation method of an electronic device according to an embodiment.

Referring to FIG. 10, an electronic device (e.g., the electronic device 101 in FIG. 1) according to an embodiment may establish communication connection with an electronic pen device (e.g., the digital pen 201 or stylus in FIG. 2, FIG. 3, and FIG. 4) in operation 1001. The communication connection may include wireless communication (e.g., Bluetooth communication). When the electronic pen device is in a detached state and located outside a predetermined range from the electronic device, the electronic pen device may operate in a Bluetooth mode to be connected to the electronic device through the Bluetooth communication.

In operation 1003, the electronic device may switch an operation state of the electronic pen device into an air pointer operation state based on the signal (e.g., a Bluetooth signal) by a button input of the electronic pen device. For example, when the electronic pen device is converted into a Bluetooth mode and a signal (e.g., a first signal) by a designated button input is received from the electronic pen device, the electronic device may start an operation for air interaction control and perform an operation of switching into an air pointer operation (air action::pointer) for air interaction control according to the air pointer operation (air action::pointer). For example, the signal (e.g., the first signal) by the designated button input may correspond to a long press button input but is not limited thereto and a button input by another operation may also be possible.

In operation 1005, the electronic device may identify that the button input is released in the electronic pen device. The air pointer operation may be maintained even when the button input is released without performing an operation corresponding to an event according to a location or a motion of the pointer in a state in which the button input of the electronic pen device 201 is continuously pressed.

In operation 1007, the electronic device may acquire location information of the electronic pen device in a state in which the button input is released in the electronic pen device and the air pointer operation is maintained. The electronic device may acquire location information (e.g., coordinate information) of the display module corresponding to a location or a motion of the electronic pen device. For example, the electronic device may acquire location information based on sensing information detected by at least one sensor (e.g., an acceleration sensor and/or a gyro sensor) of the electronic pen device. In case of acquiring the location information, the electronic device may adjust a pointer movement speed according to an aspect ratio of a screen of a display module (e.g., the display module 160 in FIG. 1). In case of acquiring the location information, the electronic device may determine a movement feature of the electronic pen device in response to the air action feature information and determine the coordinates received from the electronic pen device as location information in response to the determined feature. In case of acquiring the location information, in response to a hand grip method, the electronic device may receive slope information of the electronic pen device based on sensor information detected by at least one sensor (e.g., a gyro sensor and an acceleration sensor) of the electronic pen device.

In operation 1009, the electronic device may acquire feature information of at least one object displayed on a display. The electronic device may analyze a feature of at least one object in response to the acquired location information, identify a motion (movement) direction of the electronic pen device based on analyzed feature information, and predict a target object located in the identified motion direction. For example, when the electronic device displays at least one application on the display module, an electronic pen pointer management module (e.g., the electronic pen pointer control management module (SPCM) 501 in FIG. 5) may perform an application feature analysis and target object determination operation.

In operation 1011, the electronic device may display an object indicating an air pointer operation based on feature information and location information of at least one object.

In operation 1013, the electronic device may perform an operation corresponding to an action event of the electronic pen device and then end the operation.

Figure 11:
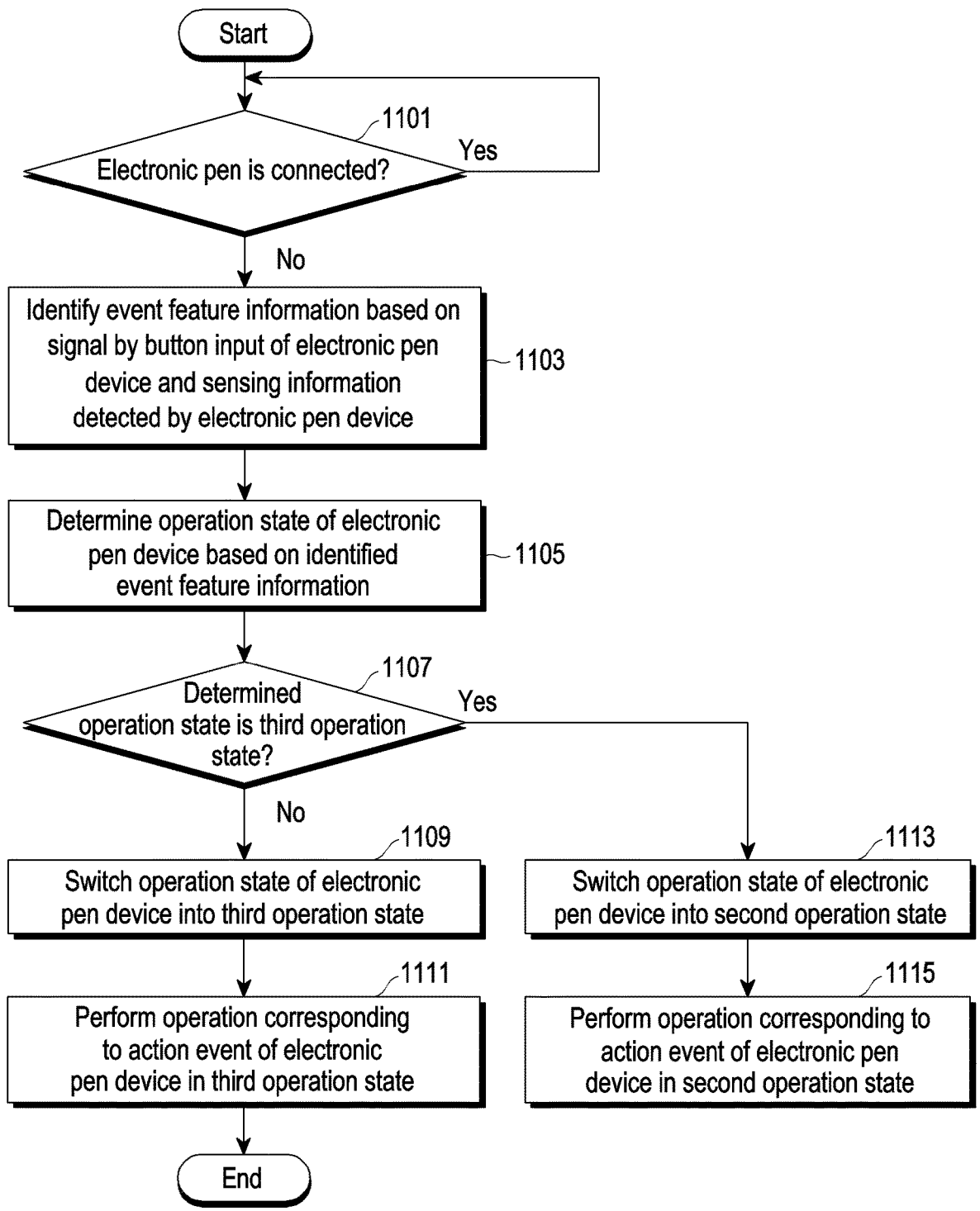
FIG. 11 is a flow diagram illustrating an example of an operation method according to an embodiment.

FIG. 11 is a view illustrating an example of an operation method of an electronic device according to an embodiment.

An electronic device (e.g., the electronic device 101 in FIG. 1) according to an embodiment may identify a state of being connected by Bluetooth communication based on connection state information acquired from an electronic pen device (e.g., the digital pen 201 or stylus in FIG. 2, FIG. 3, and FIG. 4).

Referring to FIG. 11, in operation 1101, the electronic device may receive sensing information detected by the electronic pen device and a signal (e.g., a first signal) by a button input of the electronic pen device.

In operation 1103, the electronic device may identify corresponding feature information among multiple pieces of air action feature information based on the received signal and sensing information.

In operation 1105, the electronic device may determine an operation state of the electronic pen device based on the identified feature information.

In operation 1107, the electronic device may identify whether the identified operation state corresponds to a third operation state S3 which is the air pointer operation state. When the determined operation state is the third operation state, the electronic device may perform operation 1109, and when the determined operation state is not the third operation state, may identify that the operation state of the electronic pen device corresponds to another air operation state and thus perform operation 1113.

In operation 1109, the electronic device may switch the operation state of the electronic pen device into the third operation state S3 which is the air pointer operation state, and in operation 1111, the electronic device may perform an operation corresponding to an action event of the electronic pen device in a state in which a button input is released and the air pointer operation is maintained.

In operation 1113, the electronic device may switch the operation state of the electronic pen device into a second operation state which is the air gesture operation state, and in operation 1115, the electronic device may perform an operation corresponding to an action event of the electronic pen device in the second operation state.

Figure 12A:
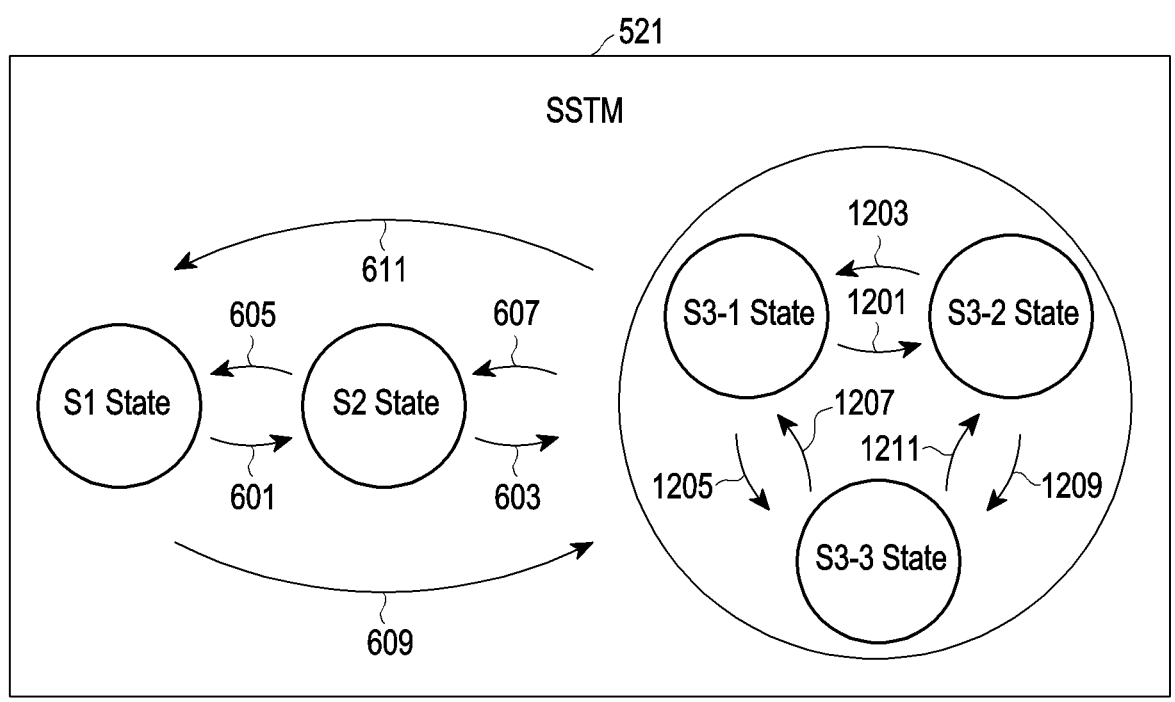
FIG. 12A is a diagram illustrating operation state switching of an electronic pen device according to an embodiment.

FIG. 12A and FIG. 12B are views illustrating examples of an operation method according to an embodiment.

Referring to FIG. 12A, switching 603 from the air gesture operation state (S2 state) or switching 609 from the connection release state S1 to the third operation state S3 which is switched in operation 1109 of FIG. 10 and corresponds to the air pointer operation state may be performed. The third operation state S3 corresponding to the air pointer operation state may include a laser pointer state S3-1 (e.g., a first air pointer operation state), a highlighter state S3-2 (e.g., a second air pointer operation state), and an up/down/left/right icon (scroll) state (e.g., S3-3) (e.g., a third air pointer operation state) and state switching 1201, 1203, 1205, 1207, 1209, 1211 may occur among states. The state switching event may correspond to a predetermined pattern (e.g., a short button input+a long button input n sec) or the like.

According to an embodiment, as shown in FIG. 12A, when Bluetooth connection with the electronic pen device is established, the electronic device may perform switching 601 from a connection release state (e.g., S1 state) into an air gesture operation state (e.g., S2 state) or switching 609 from the connection release state (e.g., S1 state) into an air pointer operation state (e.g., S3 state).

According to an embodiment, as shown in FIG. 12A, when Bluetooth connection with the electronic pen device 201 is released or the Bluetooth mode is ended, the electronic device may perform switching 605 from the air gesture operation state (e.g., S2 state) into the connection release state (e.g., S1 state) or switching 611 from the air pointer operation state (e.g., S3 state) into the connection release state (e.g., S1 state). The Bluetooth mode may be ended when an air pointer tool bar is ended or the electronic pen device 201 is inserted into a reception space (e.g., the reception space 122 in FIG. 2) of the electronic device 101.

According to an embodiment, as shown in FIG. 12A, when an event according to a signal by a designated button input or gesture input corresponding to the air gesture operation is identified, the electronic device may perform switching 607 from the air pointer operation state (e.g., S3 state) into the air gesture operation state (e.g., S2 state).

Referring to FIG. 12B, when the switching 603 from the air gesture operation state (S2 state) to the air pointer operation state S3 is performed, as shown in FIG. 12B, the electronic device 101 may identify an event 1221 corresponding to a designated button input (e.g., long press) and sensing information (e.g., a left/right motion) and when specific information corresponding to the identified event corresponds to the air pointer operation state, the electronic device 101 may perform switching into the air pointer operation state S3. As shown in part (a) of FIG. 12B, the electronic device 101 may acquire location information of a display module (e.g., the display module 160 in FIG. 1) corresponding to a location of the electronic pen device 201 on a screen of the display module 160 and display a pointer 1223 of the air pointer operation at a location corresponding to the acquired location information. When a user does not press the button 337 of the electronic pen device 201, the electronic device 101 may identify that a button input is released in the electronic pen device 201 and maintain the pointer 1223 of the air pointer operation on a screen of the display module 160 since the air pointer operation is maintained even if the button input is released.

Figure 13:
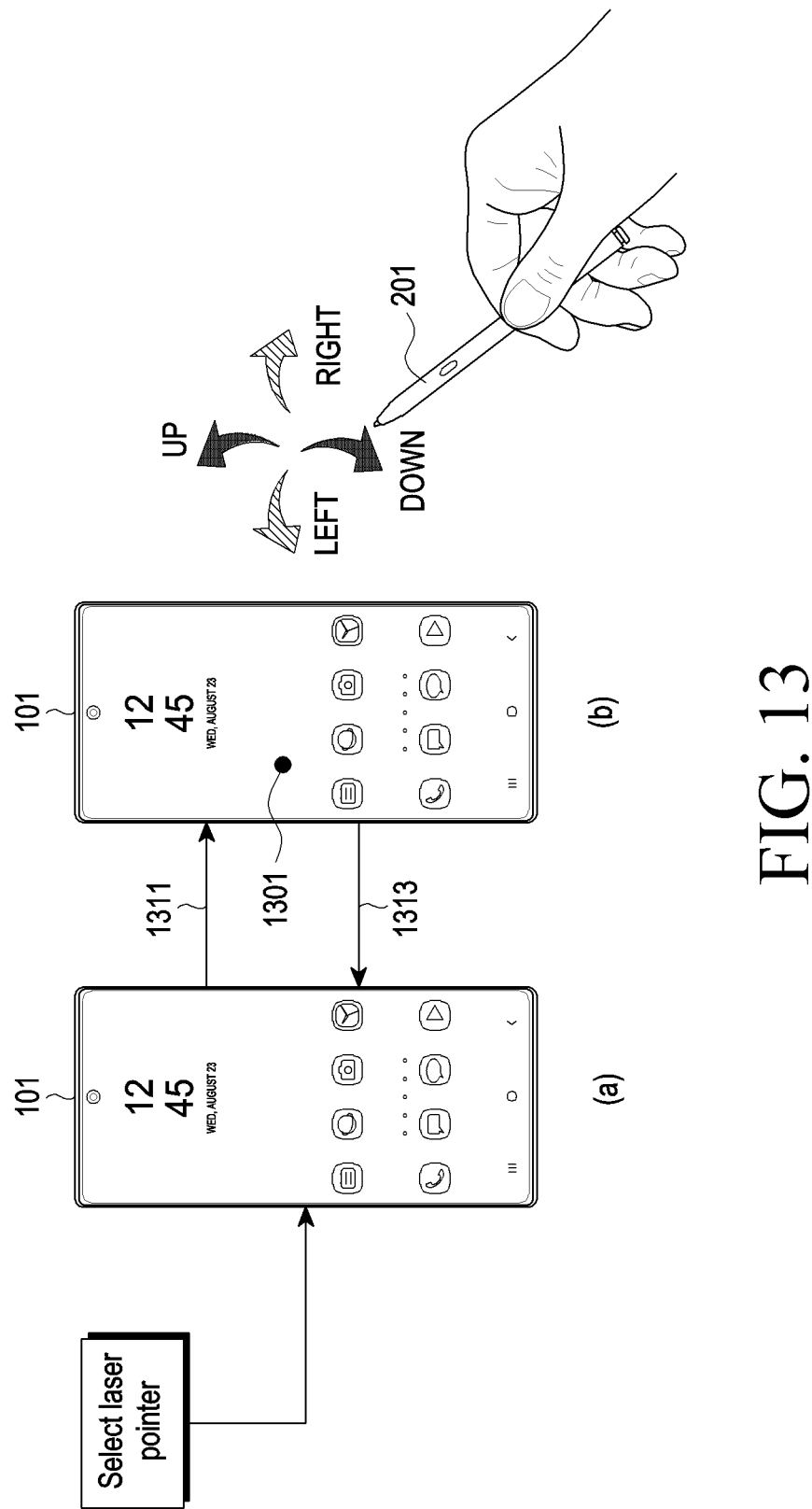
FIG. 13 is a view illustrating an example of an operation method according to an embodiment.

FIG. 13 is a view illustrating an example of an operation method according to an embodiment.

In operation 1003 in FIG. 10 and operation 1109 in FIG. 11, when the operation state of the electronic pen device 201 is switched into the air pointer operation state S3, the electronic device 101 according to an embodiment may determine one of a laser pointer state S3-1 (e.g., the first air pointer operation state), a highlighter state S3-2 (e.g., the second air pointer operation state), and an up/down/left/right icon (scroll) state (e.g., S3-3) (e.g., the third air pointer operation state) and perform switching the operation state of the electronic pen device into the determined state.

Referring to FIG. 13, when a hold down event (hold down stylus event) 1311 by a button input of the electronic pen device 201 and a motion of the electronic pen device 201 are identified in a state in which the button input is released and the air pointer operation is maintained, the electronic device 101 may identify the operation state of the electronic pen device 201 as the laser pointer state S3-1 (e.g., the first air pointer operation state) and perform switching into the laser pointer state S3-1. The electronic device 101 may acquire location information according to a motion (movement) of the electronic pen device 201 in the laser pointer state S3-1 and move a pointer 1301 displayed on a display screen based on the acquired location information. For example, the electronic device 101 may display a visual effect on a moving path of the pointer 1301. When a release event (release stylus event) 1313 by a button input occurs, the electronic device 101 may remove the displaying of the pointer 1301 displayed on the display screen.

Figure 14:
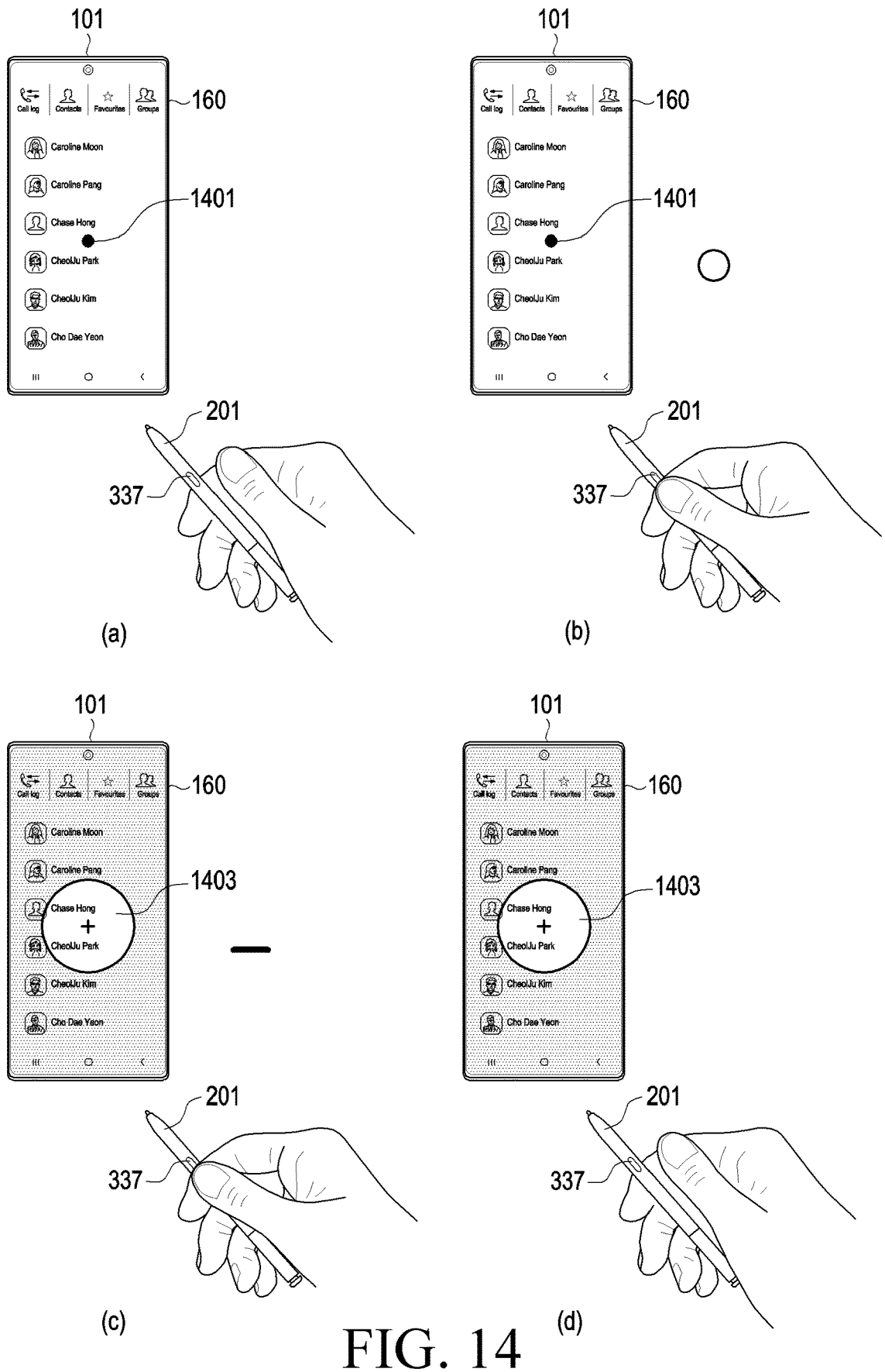
FIG. 14 is a view illustrating an example of an operation method according to an embodiment.

FIG. 14 is a view illustrating an example of an operation method according to an embodiment.

Referring to FIG. 14, as shown in part (a) in FIG. 14, in a state in which the button 337 is not pressed, that is, the button input is released and the air pointer operation is maintained, the electronic device 101 may identify a hold down stylus event by the button input corresponding to, for example, an operation of touching the button 337 (e.g., "o" in part (b) of FIG. 14) and then long pressing same (e.g., "-" in part (c) of FIG. 14). When the hold down event is identified, the electronic device 101 may identify that the operation state of the electronic pen device 201 is the highlighter state S3-2 (e.g., the second air pointer operation state) and perform switching into the highlighter state S3-2. The electronic device 101 may acquire location information of a pointer 1401 displayed corresponding to a location of the electronic pen device 201 in the highlighter state S3-2 and display an object 1403 indicating a highlighter on the acquired location information. As shown in part (d) of FIG. 14, when a release event (release stylus event) by a button input occurs, the electronic device 101 may maintain the displaying of the pointer 1403 indicating the highlighter on the display screen.

Figure 15A:
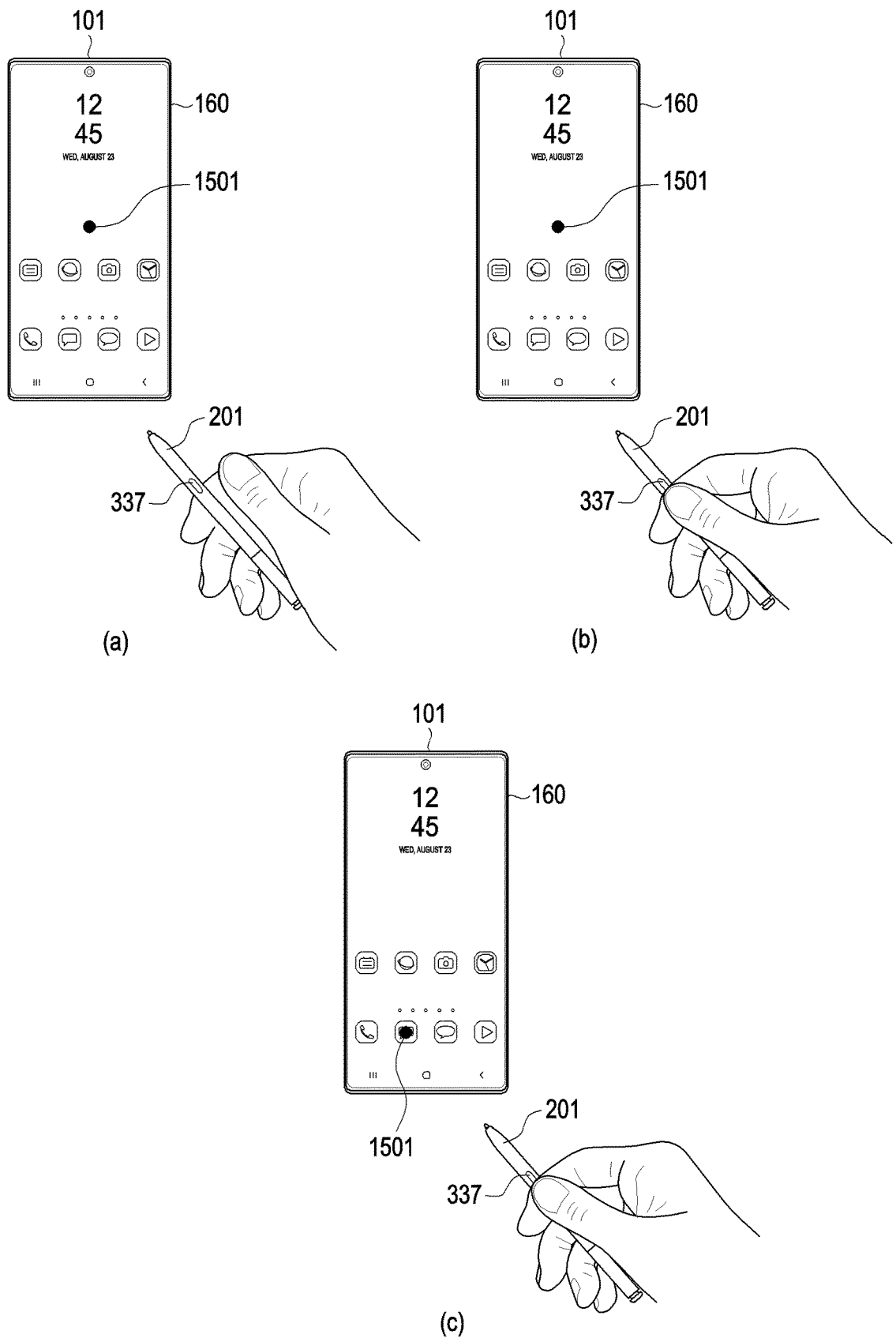
FIG. 15A and FIG. 15B are views illustrating examples of an operation method according to an embodiment.
Figure 15B:
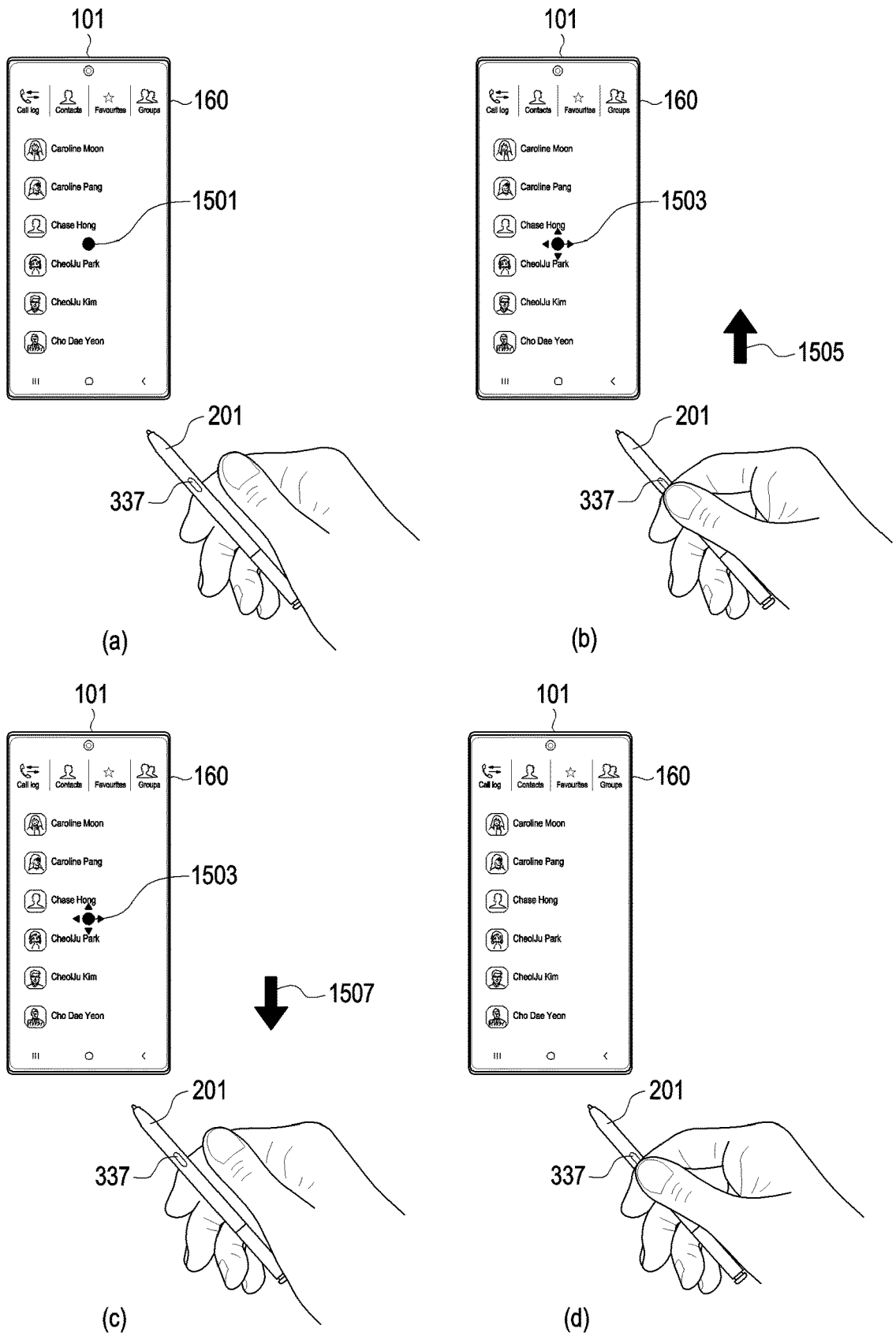

FIG. 15A and FIG. 15B are views illustrating examples of an operation method according to an embodiment.

In operation 1003 in FIG. 10 and operation 1109 in FIG. 11, when the operation state of the electronic pen device 201 is switched into the air pointer operation state S3, the electronic device 101 according to an embodiment may determine one of a laser pointer state S3-1 (e.g., the first air pointer operation state), a highlighter state S3-2 (e.g., the second air pointer operation state), and an up/down/left/right icon (scroll) state (e.g., S3-3) (e.g., the third air pointer operation state) and perform switching the operation state of the electronic pen device 201 into the determined state.

Referring to FIG. 15A, when a hold down event (hold down stylus event) by a button input of the electronic pen device 201 is identified in a state in which the button 337 is not pressed, that is, the button input is released and the air pointer operation is maintained, the electronic device 101 may identify the up/down/left/right icon (scroll) state (e.g., S3-3) (e.g., the third air pointer operation state) and perform switching into the up/down/left/right icon (scroll) state (e.g., S3-3). When movement of the electronic device is identified in the up/down/left/right icon (scroll) state (e.g., S3-3), the electronic device 101 may move and display a pointer 1501 in a moving direction.

Referring to FIG. 15B, when movement of the electronic pen device 201 in the up/down/left/right icon (scroll) state (e.g., S3-3), the electronic device 101 may move and display a pointer 1503 in a moving direction 1505, 1507.

Figure 16A:
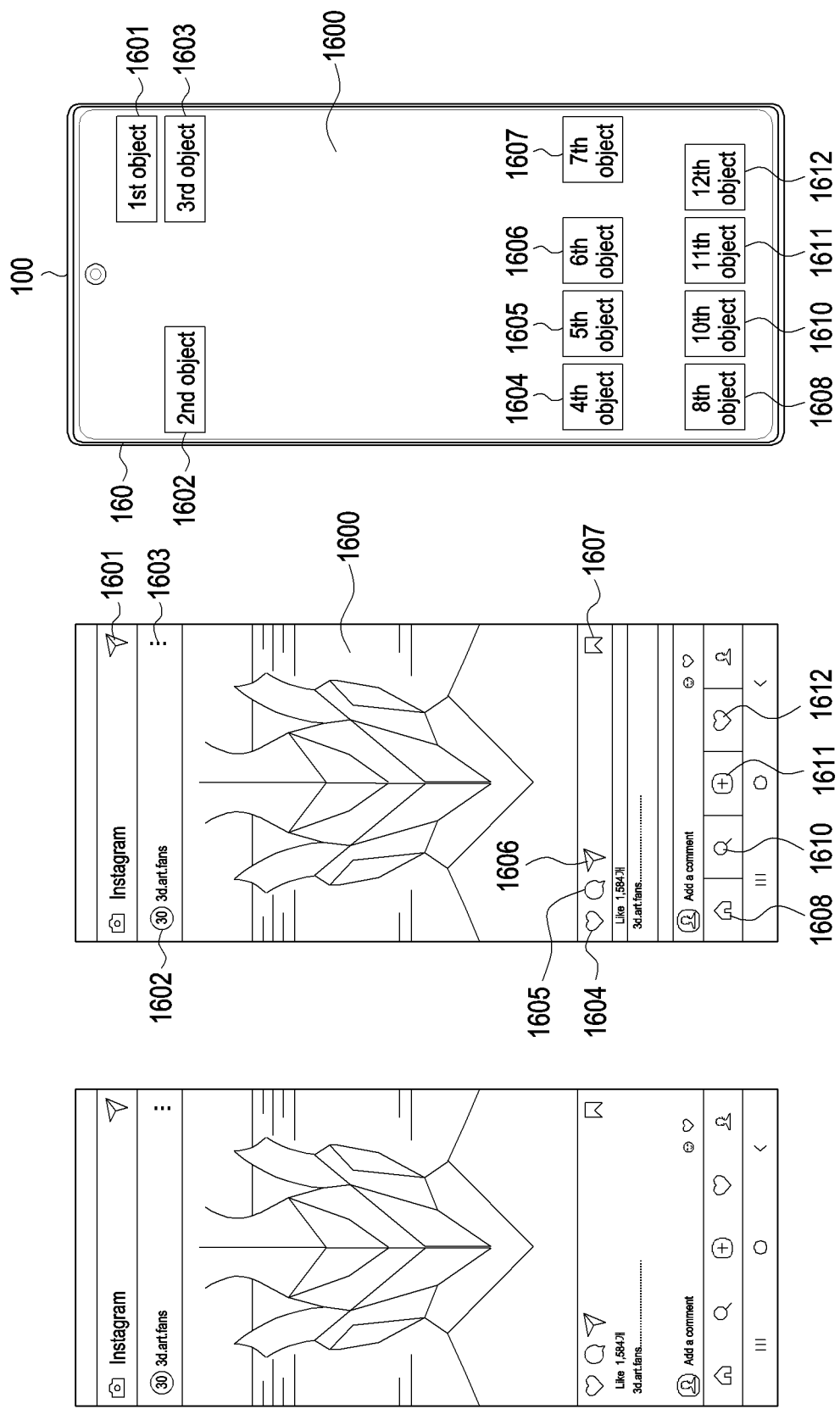
FIG. 16A and FIG. 16B are views illustrating examples of an operation method according to an embodiment.
Figure 16B:
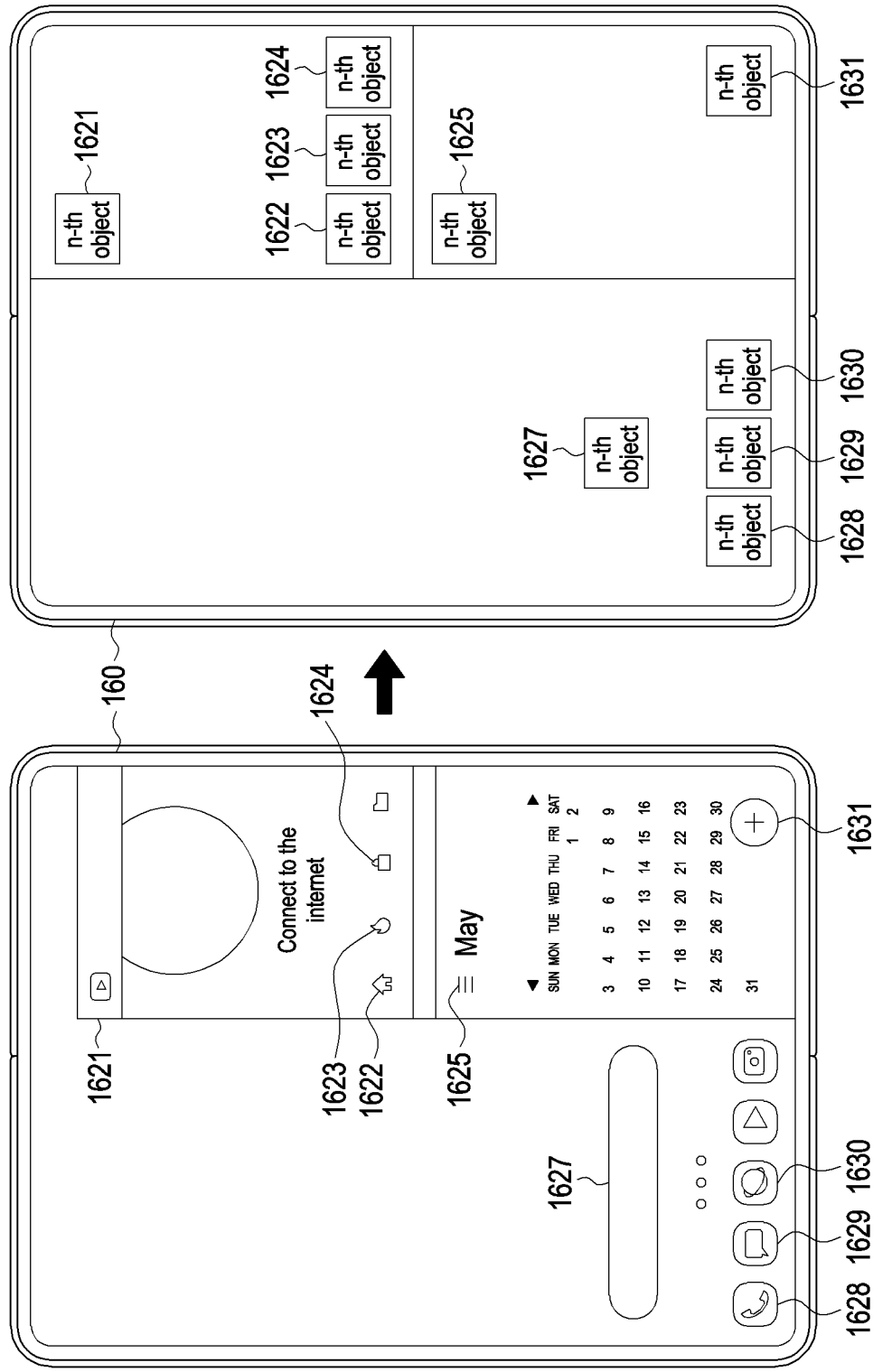

FIG. 16A and FIG. 16B are views illustrating examples of an operation method according to an embodiment.

Referring to FIG. 16A, as operation 1009 in FIG. 10, the electronic device according to an embodiment may analyze features of objects included in an application 1600 based on attribute information of the application 1600 displayed on a display module (e.g., the display module 160 in FIG. 1) in case of acquiring feature information of at least one object displayed on the display module 160 (e.g., the display module 160 in FIG. 1). The electronic device 101 may identify objects 601, 1602, 1603, 1604, 1605, 1606, 1607, 1608, 1610, 1611, 1612 (e.g., one of a button, an input field, a slide button, or a URL link) controllable by the air pointer operation among analyzed objects and map and store location information of the identified objects 1601 to 1612. For example, as shown in part (c) of FIG. 16A, the objects 1601 to 1612 may not be displayed on an execution screen of the application 1600 in part (a) of FIG. 16A, but conceptually shown for convenience of explanation, and viewed in a manager mode or configuration mode. For another example, the electronic device 101 may display images (icons or symbols) indicating the objects 1601, 1602, 1603, 1604, 1605, 1606, 1607, 1608, 1610, 1611, 1612 to overlap corresponding locations on an execution screen of the application 1600, respectively.

Referring to FIG. 16B, the electronic device 101 according to an embodiment may display multiple applications on the display module 160 in three divisions, analyze features of objects included in each of the multiple applications displayed, and identify the objects 1621, 1622, 1623, 1624, 1625, 1627, 1628, 1629, 1630, 1631 controllable by the air pointer operation. The electronic device 101 may display multiple applications on the display module 160 in two divisions, three divisions, and N divisions according to a form of a display (e.g., a foldable, rollable, or expendable display) or screen movement.

Figure 17A:
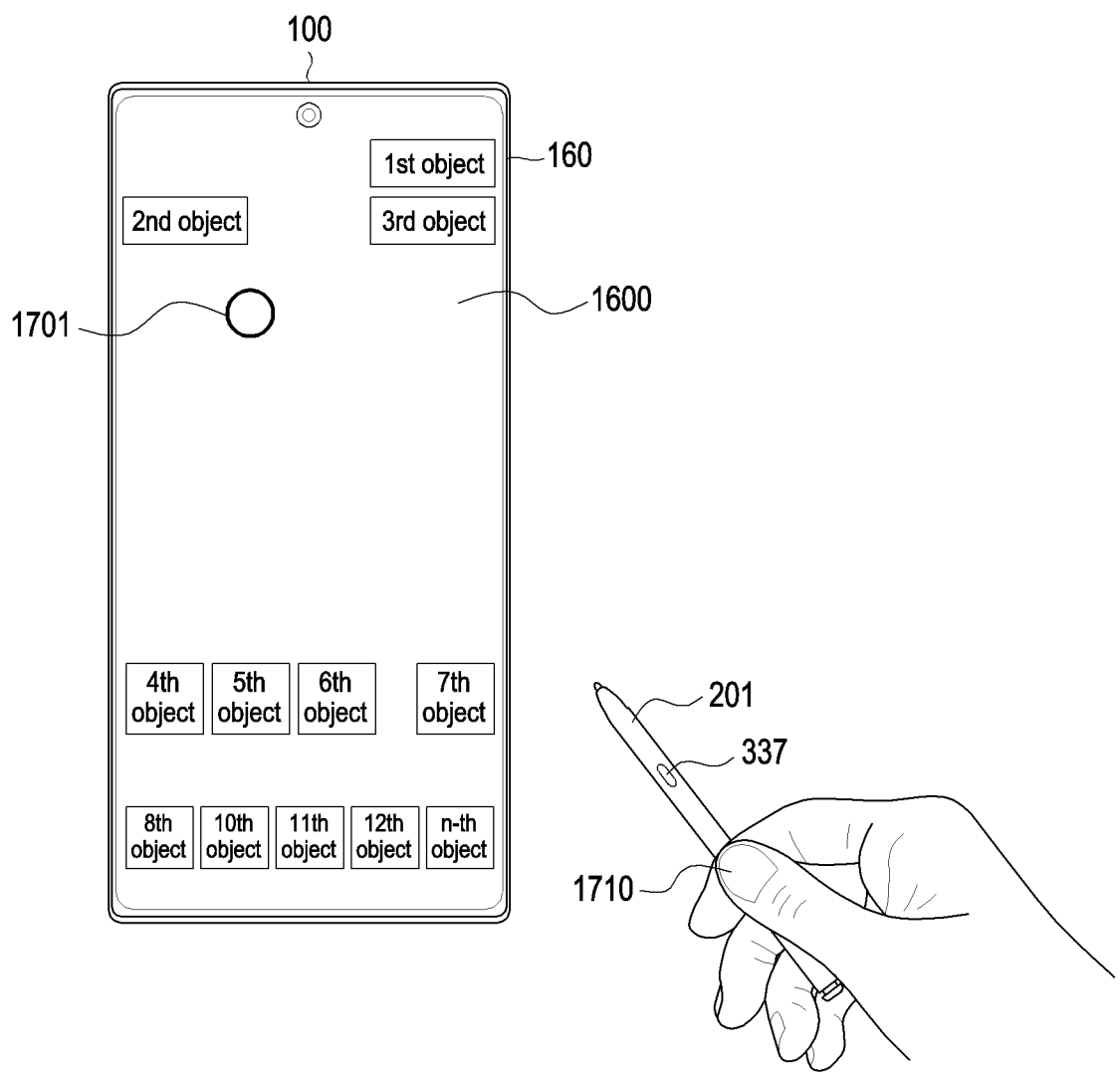
FIG. 17A, FIG. 17B, and FIG. 17C are views illustrating examples of an operation method according to an embodiment.
Figure 17B:
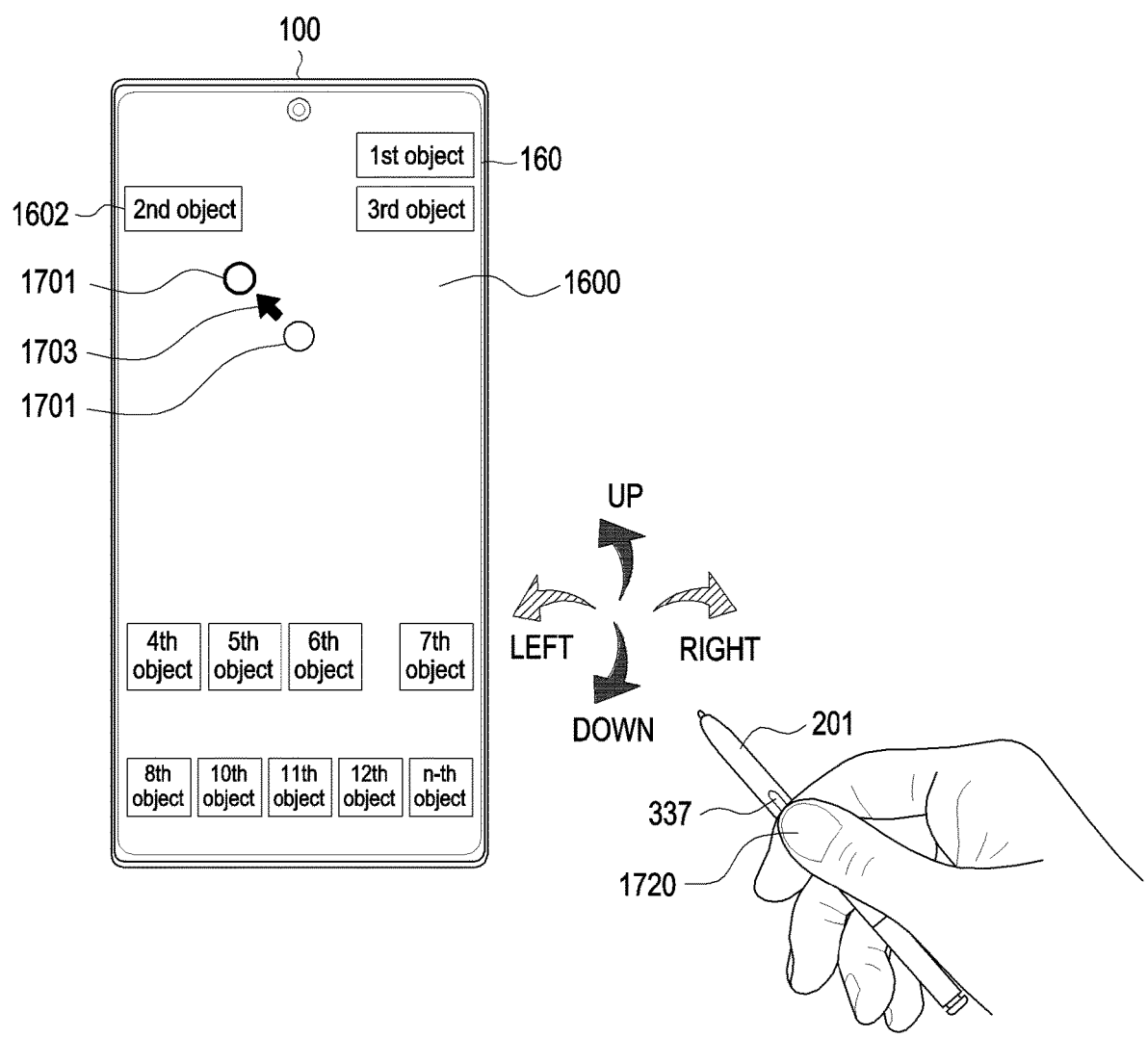
Figure 17C:
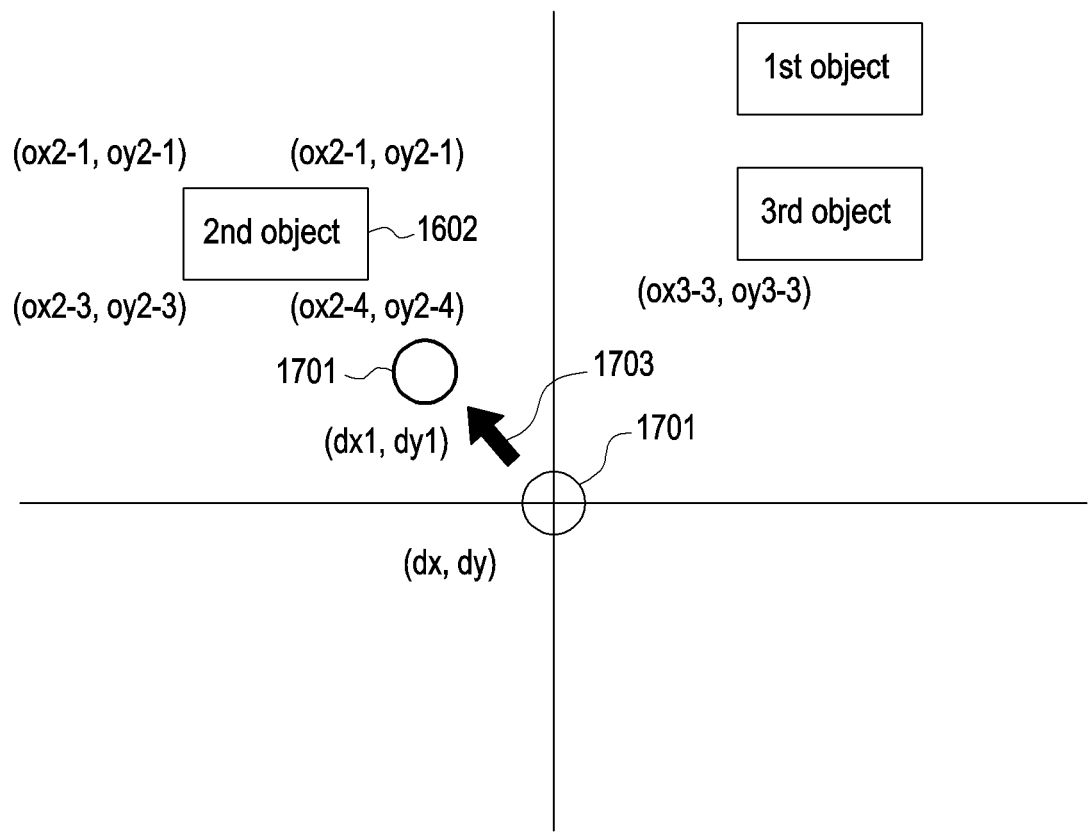

FIG. 17A, FIG. 17B, and FIG. 17C are views illustrating examples of an operation method according to an embodiment.

Referring to FIG. 17A and FIG. 17B, in a state in which the button 337 is not pressed (1710), that is, a button input is released and the air pointer operation is maintained, the electronic device 101 according to an embodiment may perform an operation of analyzing a feature of at least one object included in the application 1600 displayed on the display module 160 and determining a target object by an electronic pen pointer management module (e.g., the electronic pen pointer control management module (SPCM) 501 in FIG. 5). The electronic device 101 may identify a moving direction 1703 of a pointer 1701 moving in response to motion (movement) of the electronic device pen device 201 based on feature information with respect to at least one object analyzed in the at least one application 1600 and predict a target object 1602 located on the identified moving direction 1703.

Referring to FIG. 17B and FIG. C, according to an embodiment, the electronic device 101 may determine information (e.g., coordinate information, a target object list, or attribute information of a target object) of the at least one target object 1602 in response to feature information analysis (e.g., a layout) of the application 1600. The attribute information of the target object 1602 may have a type responding to an event of a URL link, the button 337, or an input field. For example, the electronic device 101 may receive object information of the application 1600. The received object information may include feature or coordinate information of the object. The feature information may include a button. The coordinate information may include location information (ox2, oy2) displayed on the display module 160 (e.g., the display module 160 in FIG. 1) in response to the application 1600. The electronic device 101 may identify location information (e.g., coordinate information) of a second object 1602 in response to a coordinate moving direction 1703 of the electronic pen device 201, map moving direction 1703 and acceleration (velocity) information of the pointer 1701 according to movement of the electronic pen device 201 to the location information, and then calculate a next moving direction to determine the target object 1602. For example, the electronic device 101 may use a modeling employing a heuristic modeling for predicting a moving path of the pointer (air action::laser pointer) 1701 according to the air pointer operation. The target object 1602 may be predicted and determined by calculating acceleration sensor information of the electronic pen device 201 and a moving angle of the target object 1602 and the pointer 1701.

FIG. 18A, FIG. 18B, FIG. 18C, and FIG. 18D are views illustrating examples of an operation method according to an embodiment. FIG. 19 is a view illustrating an example of an operation method according to an embodiment.

Figure 18A:
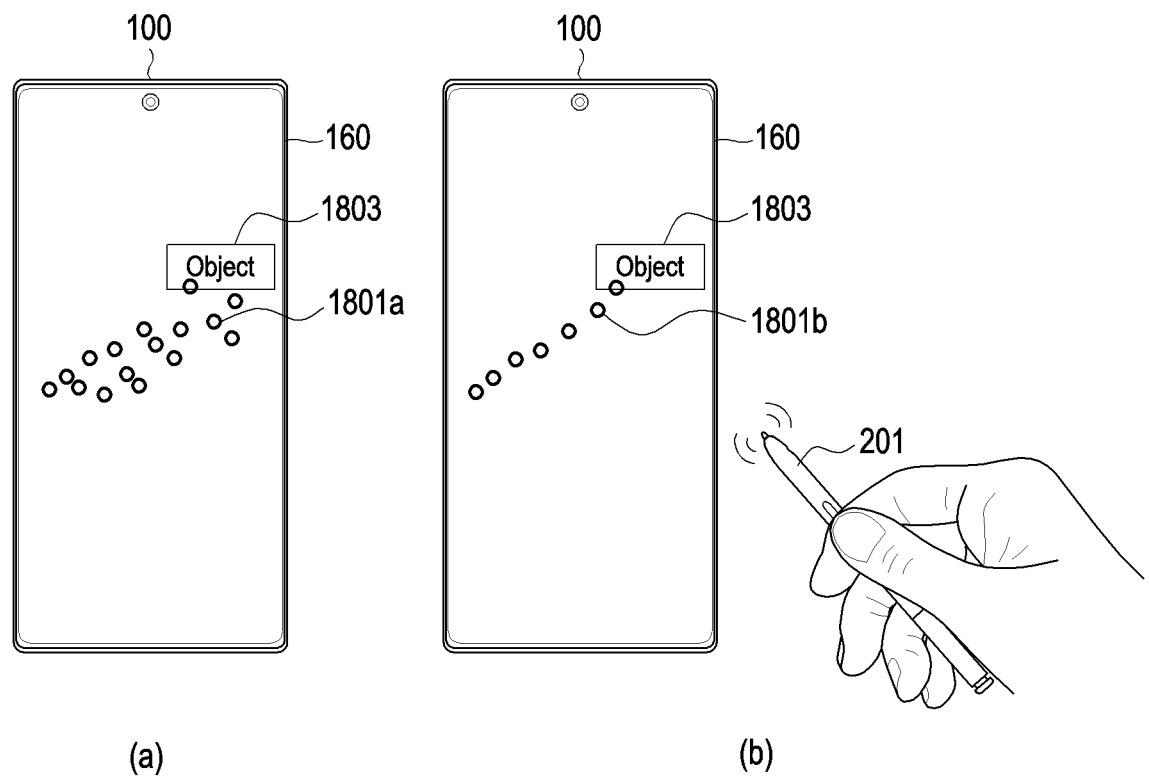
FIG. 18A, FIG. 18B, FIG. 18C, and FIG. 18D are views illustrating examples of an operation method according to an embodiment.

Referring to FIG. 18A, the electronic device 101 according to an embodiment may identify that vertical shaking and horizontal shaking occur in coordinates corresponding to a location of the electronic pen device 201 by shaking of the electronic pen device 201 caused hand tremor of a user and as shown in part (a) of FIG. 18A, pointers (air action:: pointer) 1801a may be displayed on a screen in response to coordinates caused by shaking. As shown in part (b) of FIG. 18B, when shaking occurs in response to a target object 1803 predicted on a moving path according to the movement of the electronic pen device 201, the electronic device 101 may control the shaking in response to a linear trajectory by using a linear regression analysis method at coordinates generated above and below the pointers (air action::pointer) 1801a and display corrected pointers (air action::pointer) 1801b according to the shaking control.

The electronic device 101 according to an embodiment may execute the air pointer operation (air action::laser pointer) in a state of holding the electronic pen device 201. Here, a user may develop a biological hand tremor (essential hand tremor, Parkinson's disease, and the like). For example, biological hand tremor may include a movement tremor that occurs when executing movement, such as writing, "postural tremor" that occurs when extending both arms in front of the chest or holding a pen to perform specific movements, tremor that occurs in young people who have no special abnormalities in parts of the body such as the nervous system, but has a family history of hand tremor, tremor that occurs due to psychological stress (excitement, anger, lack of sleep, anxiety, fear, and the like), and the like.

Figure 18B:
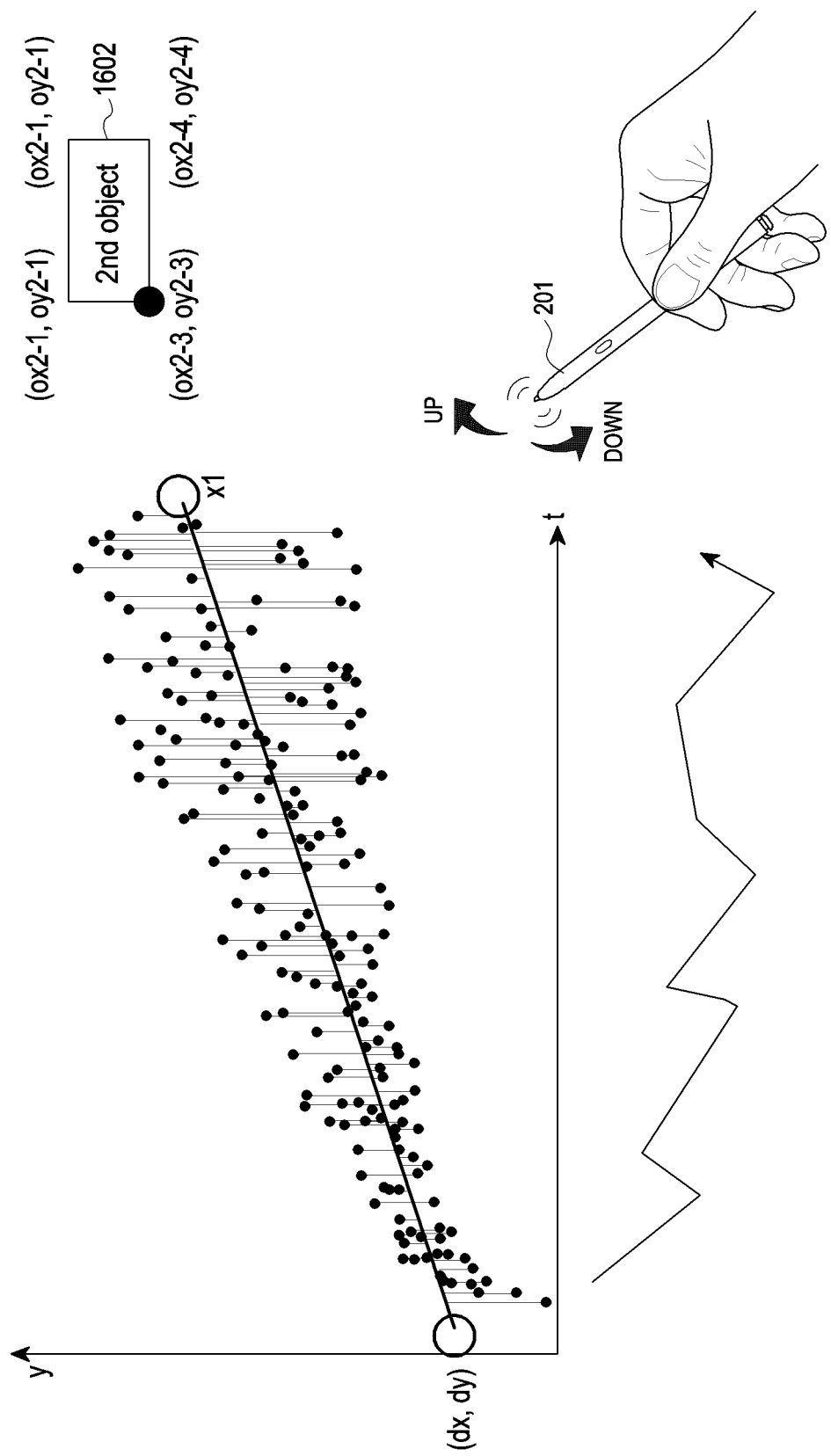

Referring to FIG. 18B, when tremor occurs in a state of holding the electronic pen device 201, a pointer generated by the air pointer operation may be moved in the electronic device 101. In response to shaking of the electronic pen device 201 caused by tremor, the electronic device 101 may receive x, y coordinate values from the electronic pen device 201. Shaking on the y-axis may occur with respect to the x-axis in a moving section to the target object (e.g., the second object), the y-axis shaking section on the graph moves linearly, and the electronic device may determine the target object 1602 by predicting a moving direction according to a linear trajectory and predicting a location of the target object 1602. The shaking with respect to the y-axis may be displayed with pointers in an actual moving section by using PID control.

Figure 18C:
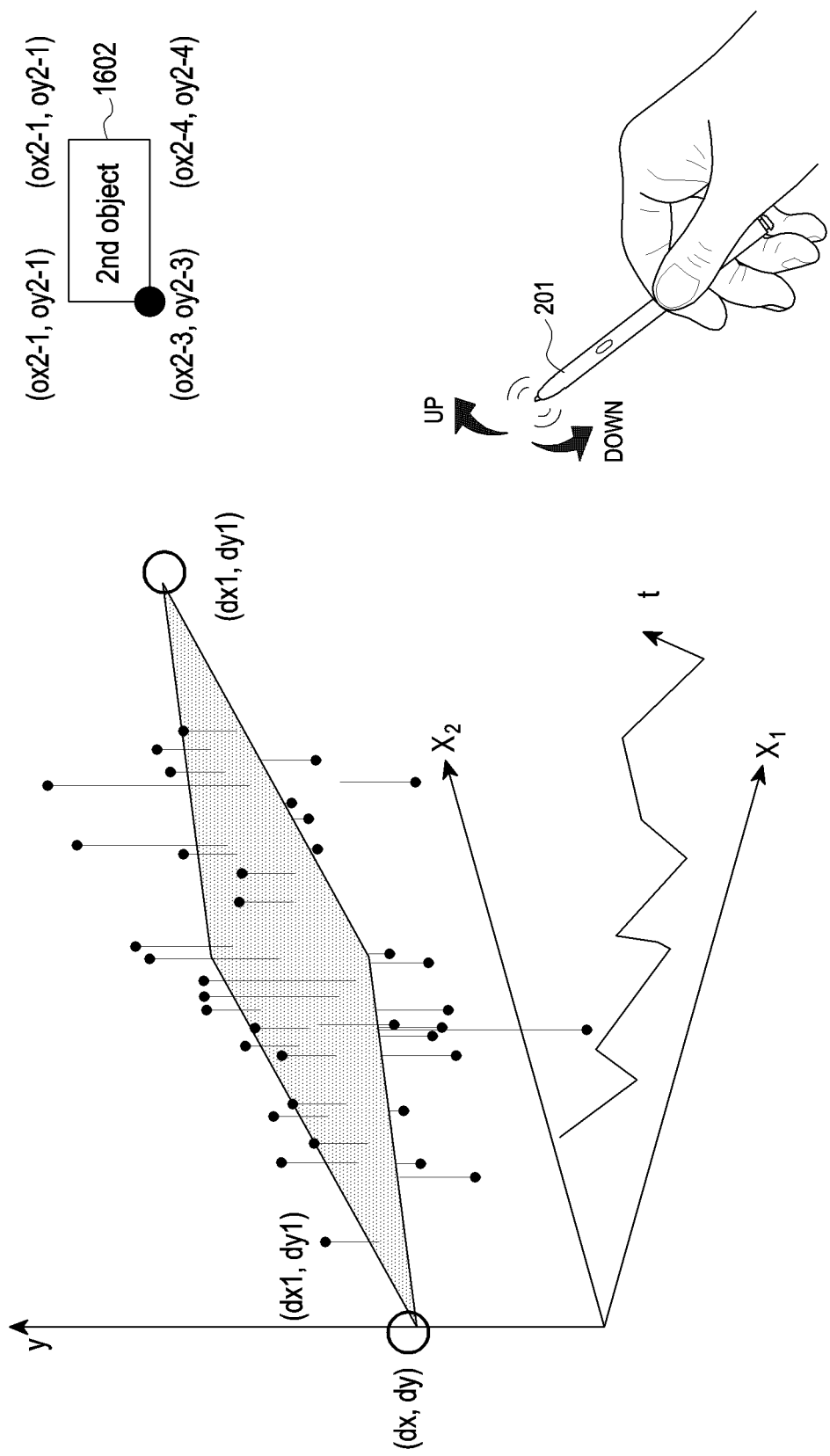

Referring to FIG. 18C, according to an embodiment, the electronic device 101 may receive multiple coordinates from the electronic pen device 201 and multiple coordinates may be coordinates for the x, y, z 3 axes, 6 axes, and 9 axes.

The electronic device 101 may predict the target object 1602 existing in a moving direction corresponding to the multiple coordinates received from the electronic pen device 201. The multiple coordinates may be used in a VR environment. For example, the electronic device 101 may receive coordinate information (6 dof, 9 dof) of the electronic pen device 201 in a VR environment. When receiving the coordinate system, the accuracy of the coordinates may decrease due to hand tremor and the coordinates may be controlled by the electronic pen pointer control manager (SPCM) (the electronic pen pointer control manager 501 in FIG. 5) to display a virtual reality (VR) image.

Figure 18D:
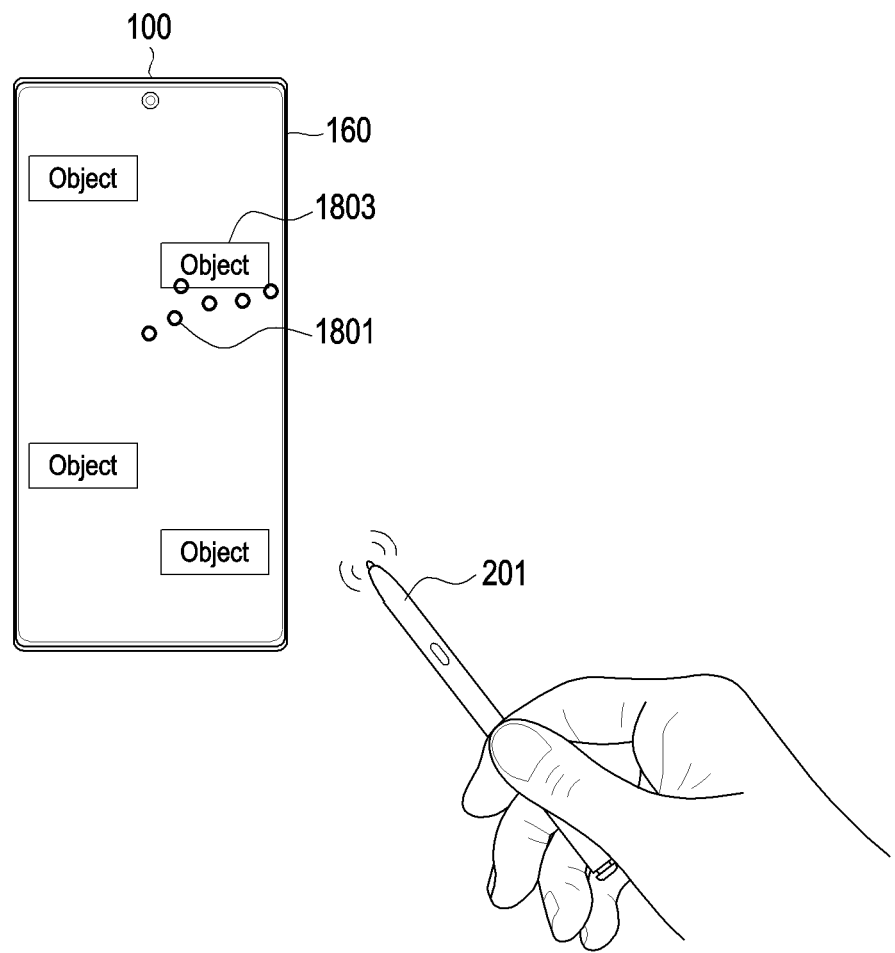

Referring to FIG. 18D, the electronic device 101 may perform an operation corresponding to an action event of the electronic pen device 201. In response to the shaking of the electronic pen device 201 caused by hand tremor, the electronic device 101 may determine location information (e.g., coordinate information). The determined location information (e.g., coordinate information) may be mapped to the feature information (target object area) and when a predetermined condition is satisfied (e.g., a pointer exists in the target object area for N sec), the electronic device 101 may perform an operation (button event execution) corresponding to the action event. For example, assuming that a user clicks on a certain location and the pointer 1801 is located at a position slightly deviated from an item the user wants to click, and when a clickable object area is acquired by using accessibility and a clickable object (or an item) 1803 exists in an adjacent area of the clicked area, the electronic device 101 may click the object 1803 in order to compensate the item not being clicked.

According to an embodiment, an operation method in an electronic device for controlling an electronic pen device may include an operation of controlling a communication module to establish a communication connection with the electronic pen device, an operation of switching an operation state of the electronic pen device into an air pointer operation state based on a first signal by a button input of the electronic pen device, an operation of acquiring location information of a display module, which corresponds to a location or a motion of the electronic pen device, in a state in which the button input is released and the air pointer operation is maintained, an operation of controlling the display module to display an object indicating the air pointer operation, based on feature information of at least one object displayed on the display module and the location information, and an operation of executing an operation corresponding to an action event of the electronic pen device.

According to an embodiment, communication connection with the electronic pen device may be established by using a Bluetooth communication method.

According to an embodiment, the operation method may further include, when a second signal related to at least one of the button input or gesture input is received from the electronic pen device in a state in which the button input is released and the air pointer operation is maintained, an operation of performing switching into a first air pointer operation state, when a third signal related to at least one of the button input or gesture input is received in a state in which the button input is released and the air pointer operation is maintained, an operation of performing switching into a second air pointer operation state, and when a fourth signal related to at least one of the button input or gesture input is received in a state in which the button input is released and the air pointer operation is maintained, an operation of performing switching into a third air pointer operation state.

According to an embodiment, the operation method may further include, when communication connection with the electronic pen device is established, an operation of acquiring sensing information detected by at least one sensor of the electronic pen device.

According to an embodiment, the operation of switching the operation state of the electronic pen device into the air pointer operation state may include an operation of identifying feature information of a designated air action based on the first signal and the sensing information, and when the identified feature information corresponds to the air pointer operation, an operation of mapping the air action of the electronic pen device to the air pointer operation.

According to an embodiment, the operation method may further include, when the identified feature information does not correspond to the air pointer operation, an operation of switching the operation state of the electronic pen device into an air gesture operation state.

According to an embodiment, the operation method may further include, when communication connection with the electronic pen device is released, an operation of switching the operation state of the electronic pen device into a communication connection release state in the air pointer operation state.

According to an embodiment, the operation of acquiring the location information of the display module may include an operation of controlling a pointer movement speed by the air pointer operation based on the width or height ratio of a screen of the display module, screen resolution information, or the refresh rate of the screen.

According to an embodiment, the operation method may include an operation of analyzing the feature information of the at least one object displayed on the display module, an operation of identifying at least one object controllable by the air pointer operation based on the analyzed feature information, an operation of mapping identification information of the identified at least one object to the location information of the display module on which the identified at least one object is displayed to be stored in the memory of the electronic device, and an operation of identifying a target object located in the moving direction of the electronic pen device from the identified at least one object.

According to an embodiment, the operation method may further include an operation of acquiring location values according to shaking of the electronic pen device caused by hand tremor of a user, an operation of correcting the acquired location values by using a linear regression analysis technique, and an operation of predicting a target object located in the moving direction of the electronic pen device based on the corrected location values.

A non-transitory computer-readable recording medium may include a hard disc, a floppy disc, a magnetic media (e.g., a magnetic tape), an optical media (e.g., a compact disc read only memory (CD-ROM), a digital versatile disc (DVD), a magneto-optical media (e.g., a floptical disk)), a hardware device (e.g., a read only memory (ROM), a random access memory (RAM), a flash memory, and the like), and the like. Furthermore, the program commands include a high-level language code executable by computers using the interpreter as well as the machine language codes created by a compiler. The aforementioned hardware device can be implemented with one or more software modules for executing the operations of the various exemplary embodiments of the present disclosure, and vice versa.

According to an embodiment, in a non-transitory storage medium storing one or more programs, the one or more programs may include executable instructions that when executed by a processor of an electronic device, causes the electronic device to perform an operation of controlling a communication module to establish a communication connection with the electronic pen device, an operation of switching an operation state of the electronic pen device into an air pointer operation state based on a first signal by a button input of the electronic pen device, an operation of acquiring location information of a display module, which corresponds to a location or a motion of the electronic pen device, in a state in which the button input is released and the air pointer operation is maintained, an operation of controlling the display module to display an object indicating the air pointer operation, based on feature information of at least one object displayed on the display module and the location information, and an operation of executing an operation corresponding to an action event of the electronic pen device.

The embodiments disclosed herein are provided merely to easily describe technical details of the disclosure and to help the understanding of the disclosure, and are not intended to limit the scope of various embodiments of the present disclosure. Therefore, it should be construed that all modifications and changes or various other embodiments based on the technical idea of various embodiments of the disclosure fall within the scope of various embodiments of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device for controlling an operation of an electronic pen device, the electronic device comprising:
   communication circuitry;
   a display;
   memory storing instructions; and
   at least one processor electrically connected to the communication circuitry, the display and the memory; and
   wherein the instructions are configured to, when executed by the at least one processor, cause the electronic device to:
      control the communication circuitry to establish a communication connection with the electronic pen device,
      switch an operation state of the electronic pen device into an air pointer operation state based on a first signal by a button input of the electronic pen device,
      acquire location information of the display when the button input is released and an air pointer operation is maintained, wherein the location information of the display corresponds to a location or a motion of the electronic pen device,
      control the display to display an object indicating the air pointer operation, based on feature information of at least one object displayed on the display and the location information,
      identify a target object located in a moving direction of the electronic pen device based on a mapping of the at least one object displayed on the display to the location information of the display on which the at least one object displayed, and
      execute an operation corresponding to an action event of the electronic pen device associated with the target object.

2. The electronic device of claim 1, wherein the communication connection with the electronic pen device is established by using Bluetooth communication, and
   Wherein the instructions are configured to, when executed by the at least one processor, cause the electronic device to:
      switch the electronic pen device into a first air pointer operation state based on receiving a second signal related to at least one of the button input or gesture input from the electronic pen device, wherein the button input is released and the air pointer operation is maintained,
      switch the electronic pen device into a second air pointer operation state based on receiving a third signal related to at least one of the button input or gesture input, wherein the button input is released and the air pointer operation is maintained, and
      switch the electronic pen device into a third pointer operation state based on receiving a fourth signal related to at least one of the button input or gesture input, wherein the button input is released and the air pointer operation is maintained.

3. The electronic device of claim 1, wherein the instructions are configured to, when executed by the at least one processor, cause the electronic device to:
   acquire sensing information detected by at least one sensor of the electronic pen device based on the communication connection with the electronic pen device being established,
   identify feature information of a designated action based on the first signal and the sensing information,
   map an air action of the electronic pen device to the air pointer operation and perform switching into the air pointer operation state based on the feature information of the designated action corresponding to the air pointer operation, and
   switch the operation state of the electronic pen device into an air gesture operation based on the feature information of the designated action not corresponding to the air pointer operation.

4. The electronic device of claim 1, wherein the instructions is configured to, when executed by the at least one processor, cause the electronic device to switch the electronic pen device into a communication connection release state from the air pointer operation state based on the communication connection with the electronic pen device being released.

5. The electronic device of claim 1, wherein acquiring location information of the display comprises controlling a pointer movement speed by the air pointer operation based on a width or height ratio of a screen of the display, screen resolution information, or a refresh rate of the screen of the display module-based on the location information.

6. The electronic device of claim 1, wherein the instructions are configured to, when executed by the at least one processor, cause the electronic device to:
   analyze the feature information of the at least one object displayed on the display,
   identify at least one controllable object from the at least one object that is controllable by the air pointer operation based on the analyzed feature information,
   map identification information of the identified at least one controllable object to the location information of the display on which the identified at least one controllable object is displayed to be stored in the memory, and
   identify the target object located in the moving direction of the electronic pen device from the identified at least one controllable object.

7. The electronic device of claim 1, wherein the instructions are configured to, when executed by the at least one processor, cause the electronic device to:
   acquire location values according to shaking of the electronic pen device caused by hand tremor of a user,
   correct the acquired location values by using a linear regression analysis, and
   predict the target object located in the moving direction of the electronic pen device based on the corrected location values.

8. An operation method in an electronic device for controlling an electronic pen device, the operation method comprising:
   controlling a communication to establish a communication connection with the electronic pen device;
   switching an operation state of the electronic pen device into an air pointer operation state based on a first signal by a button input of the electronic pen device;
   acquiring location information of a display when the button input is released and an air pointer operation is maintained, wherein the location information of the display corresponds to a location or a motion of the electronic pen device;

controlling the display to display an object indicating the air pointer operation, based on feature information of at least one object displayed on the display and the location information;

identifying a target object located in a moving direction of the electronic pen device based on a mapping of the at least one object displayed on the display to the location information of the display on which the at least one object is displayed; and executing an operation corresponding to an action event of the electronic pen device associated with the target object.

9. The operation method of claim 8, further comprising:

based on a second signal related to at least one of the button input or gesture input being received from the electronic pen device when the button input is released and the air pointer operation is maintained, performing switching into a first air pointer operation state;

based on a third signal related to at least one of the button input or gesture input being received when the button input is released and the air pointer operation is maintained, performing switching into a second air pointer operation state; and based on a fourth signal related to at least one of the button input or gesture input being received when the button input is released and the air pointer operation is maintained, performing switching into a third air pointer operation state, wherein the communication connection with the electronic pen device is established by using Bluetooth communication.

10. The operation method of claim 8, further comprising:

based on the communication connection with the electronic pen device being established, acquiring sensing information detected by at least one sensor of the electronic pen device;

based on the feature information of the at least one object not corresponding to the air pointer operation, switching the operation state of the electronic pen device into an air gesture operation, wherein the switching of the operation state of the electronic pen device into the air pointer operation state comprises:

identifying feature information of a designated action based on the first signal and the sensing information; and based on the feature information of the at least one object corresponding to the air pointer operation, mapping the air action of the electronic pen device to the air pointer operation.

11. The operation method of claim 8, further comprising, based on the communication connection with the electronic pen device being released, switching the operation state of the electronic pen device into a communication connection release state from the air pointer operation state.

12. The operation method of claim 8, wherein the acquiring of the location information of the display comprises controlling a pointer movement speed by the air pointer operation based on a width or height ratio of a screen of the display, screen resolution information, or refresh rate of the screen of the display.

13. The operation method of claim 8, wherein the identifying of the target object comprises:

analyzing the feature information of the at least one object displayed on the display;

identifying at least one controllable object from the at least one object that is controllable by the air pointer operation based on the analyzed feature information;

mapping identification information of the identified at least one controllable object to the location information of the display on which the identified at least one controllable object is displayed to be stored in the memory of the electronic device; and identifying the target object located in the moving direction of the electronic pen device from the identified at least one controllable object.

14. The operation method of claim 8, wherein the identifying of the target object comprises:

acquiring location values according to shaking of the electronic pen device caused by hand tremor of a user;

correcting the acquired location values by using a linear regression analysis; and predicting the target object located in the moving direction of the electronic pen device based on the corrected location values.

15. A non-transitory storage medium storing one or more programs, the one or more programs comprising executable instructions configured to, when executed by a processor of an electronic device, cause the electronic device to:

control a communication to establish a communication connection with an electronic pen device;

switch an operation state of the electronic pen device into an air pointer operation state based on a first signal by a button input of the electronic pen device;

acquire location information of a display module-when the button input is released and an air pointer operation is maintained, wherein the location information of the display corresponds to a location or a motion of the electronic pen device;

control the display to display an object indicating the air pointer operation, based on feature information of at least one object displayed on the display module and the location information;

identify a target object located in a moving direction of the electronic pen device based on a mapping of the at least one object displayed on the display to the location information of the display on which the at least one object is displayed; and execute an operation corresponding to an action event of the electronic pen device associated with the target object.

* * * * *